United States Patent
Haltiner, Jr.

(10) Patent No.: US 9,617,878 B2
(45) Date of Patent: Apr. 11, 2017

(54) CAMSHAFT PHASER AND ACTUATOR FOR THE SAME

(71) Applicant: DELPHI TECHNOLOGIES, INC., Troy, MI (US)

(72) Inventor: Karl J. Haltiner, Jr., Fairport, NY (US)

(73) Assignee: Delphi Technologies, Inc., Troy, MI (US)

( * ) Notice: Subject to any disclaimer, the term of this patent is extended or adjusted under 35 U.S.C. 154(b) by 32 days.

(21) Appl. No.: 14/613,630

(22) Filed: Feb. 4, 2015

(65) Prior Publication Data
US 2016/0222836 A1 Aug. 4, 2016

(51) Int. Cl.
| | |
|---|---|
| F01L 1/34 | (2006.01) |
| F01L 1/344 | (2006.01) |
| F01L 1/047 | (2006.01) |
| F01L 1/352 | (2006.01) |
| F01L 9/02 | (2006.01) |
| F16H 1/46 | (2006.01) |
| F16H 37/04 | (2006.01) |
| F16H 57/08 | (2006.01) |

(52) U.S. Cl.
CPC ............. *F01L 1/3442* (2013.01); *F01L 1/047* (2013.01); *F01L 1/352* (2013.01); *F01L 9/02* (2013.01); *F16H 1/46* (2013.01); *F16H 37/04* (2013.01); *F16H 57/082* (2013.01); *F16H 2200/2007* (2013.01); *F16H 2200/2097* (2013.01)

(58) Field of Classification Search
CPC ... F01L 2001/34496; F01L 2001/34493; F01L 2001/34426; F01L 2001/34433; F01L 2001/34486; F01L 2001/3448; F01L 1/3442

USPC ....................................................... 123/90.17
See application file for complete search history.

(56) References Cited

U.S. PATENT DOCUMENTS

| | | | |
|---|---|---|---|
| 5,327,859 | A | 7/1994 | Pierik et al. |
| 5,507,254 | A | 4/1996 | Melchior et al. |
| 5,645,017 | A | 7/1997 | Melchior et al. |
| 5,649,506 | A | 7/1997 | Melchior et al. |

(Continued)

FOREIGN PATENT DOCUMENTS

EP       2006501 A1       12/2008

OTHER PUBLICATIONS

U.S. Appl. No. 14/554,385, Haltiner, Jr. U.S. Appl. No. 14/554,400, Haltiner, Jr. et al.

*Primary Examiner* — Jorge Leon, Jr.
(74) *Attorney, Agent, or Firm* — Joshua M. Haines

(57) ABSTRACT

A camshaft phaser includes a camshaft phaser input member connectable to a crankshaft; a camshaft phaser output member connectable to a camshaft; an intermediate member rotatable relative to the camshaft phaser input member such that rotation of the intermediate member relative to the camshaft phaser input member causes the camshaft phaser output member to rotate relative to the camshaft phaser input member; and a rotational actuator configured to selectively rotate the intermediate member relative to the camshaft phaser input member, the rotational actuator comprising. The rotational actuator includes a compound planetary gear set having an input planetary gear set driven by the camshaft phaser input member and an output planetary gear set driven by the input planetary gear set; and an adjusting actuator connected to the compound planetary gear set.

38 Claims, 13 Drawing Sheets

(56) References Cited

U.S. PATENT DOCUMENTS

| | | |
|---|---|---|
| 7,523,728 B2 | 4/2009 | Berndorfer |
| 8,534,246 B2 | 9/2013 | Lichti et al. |
| 8,899,199 B1 | 12/2014 | Waters |
| 2005/0066924 A1 | 3/2005 | Lehmann et al. |
| 2009/0120388 A1* | 5/2009 | Lee .................. F01L 1/022 |
| | | 123/90.11 |
| 2014/0123920 A1 | 5/2014 | Lichti et al. |

* cited by examiner

CAMSHAFT PHASER AND ACTUATOR FOR THE SAME

TECHNICAL FIELD OF INVENTION

The present invention relates to a camshaft phaser for varying the phase relationship between a crankshaft and a camshaft in an internal combustion engine; more particularly to such a camshaft phaser which is a vane-type camshaft phaser; even more particularly to a vane-type camshaft phaser which includes a control valve in which the position of the control valve determines the phase relationship between the crankshaft and the camshaft, and still even more particularly to an actuator for positioning the control valve of such a camshaft phaser.

BACKGROUND OF INVENTION

A typical vane-type camshaft phaser for changing the phase relationship between a crankshaft and a camshaft of an internal combustion engine generally comprises a plurality of outwardly-extending vanes on a rotor interspersed with a plurality of inwardly-extending lobes on a stator, forming alternating advance and retard chambers between the vanes and lobes. Engine oil is selectively supplied to one of the advance and retard chambers and vacated from the other of the advance chambers and retard chambers by a phasing oil control valve in order to rotate the rotor within the stator and thereby change the phase relationship between the camshaft and the crankshaft. One such camshaft phaser is described in U.S. Pat. No. 8,534,246 to Lichti et al., the disclosure of which is incorporated herein by reference in its entirety and hereinafter referred to as Lichti et al. As is typical for phasing oil control valves, the phasing oil control valve of Lichti et al. operates on the principle of direction control, i.e. the position of the oil control valve determines the direction of rotation of the rotor relative to the stator. More specifically, when a desired phase relationship between the camshaft and the crankshaft is determined, the desired phase relationship is compared to the actual phase relationship as determined from the outputs of a camshaft position sensor and a crankshaft position sensor. If the actual phase relationship, does not match the desired phase relationship, the oil control valve is actuated to either 1) an advance position to supply oil to the retard chambers and vent oil from the advance chambers or 2) a retard position to supply oil to the advance chambers and vent oil from the retard chambers until the actual phase relationship matches the desired phase relationship. When the actual phase relationship matches the desired phase relationship, the oil control valve is positioned to hydraulically lock the rotor relative to the stator. However, leakage from the advance chambers and the retard chambers or leakage from the oil control valve may cause the phase relationship to drift over time. When the drift in phase relationship is detected by comparing the actual phase relationship to the desired phase relationship, the oil control valve must again be actuated to either the advance position or the retard position in order to correct for the drift, then the oil control valve is again positioned to hydraulically lock the rotor relative to the stator after the correction has been made. Consequently, the position of the rotor relative to the stator is not self-correcting and relies upon actuation of the phasing oil control valve to correct for the drift.

U.S. Pat. No. 5,507,254 to Melchior, hereinafter referred to as Melchior, teaches a camshaft phaser with a phasing oil control valve which allows for self-correction of the rotor relative to the stator as may be necessary due to leakage from the advance chamber or from the retard chamber. Melchior also teaches that the valve spool defines a first recess and a second recess separated by a rib such that one of the recesses acts to supply oil to the advance chamber when a retard in timing of the camshaft is desired while the other recess acts to supply oil to the retard chamber when an advance in the timing of the camshaft is desired. The recess that does not act to supply oil when a change in phase is desired does not act as a flow path. Melchior also teaches that the valve spool may be moved axially or rotationally in order to direct oil to the required chamber. In order to rotate the valve spool, an arm is provided which is sensitive to engine speed. The arm is geared to the valve spool, and consequently adjusts the rotational position of the valve spool as directed by the position of the arm based on engine speed. However, rotating the oil control valve directly and mechanically by an arm that is sensitive to engine speed may not be adequate for operation because modern internal combustion engines rely on many parameters, typically provided by various sensors which monitor various aspects of engine performance, processed by an electronic processor, for example an engine control module, to determine a desired camshaft phase. Consequently, it is desirable to have an actuator which is able to rotationally position the phasing oil control valve while taking into account any number of engine performance indicators.

U.S. Pat. No. 4,770,060 to Elrod et al., herein after referred to as Elrod et al., teaches a camshaft phaser which uses a gear drive mechanism, and more specifically a harmonic gear drive mechanism, actuated by an electric motor, to alter the phase relationship. The electric motor rotates together with the camshaft, and consequently includes slip rings in order to transmit electricity to the electric motor. When no change in phase is desired, no electricity is transmitted to the electric motor, thereby not inducing movement in the gear drive mechanism. However, it may not be desirable to use slip rings which may encounter issues in implementation.

U.S. Pat. No. 6,981,478 to Shafer et al., hereinafter referred to as Shafer et al., also teaches a camshaft phaser which uses a gear drive mechanism actuated by an electric motor to alter the phaser relationship. However, unlike Elrod et al. which requires slip rings to power the electric motor, the electric motor of Shafer et al. does not rotate with the camshaft, thereby eliminating the need for slip rings. However, in order for the electric motor of Shafer et al. to remain stationary, an output shaft of the electric motor which engages the gear drive mechanism must be speed matched with the input side of the camshaft phaser when no change in phase is desired, thereby requiring the electric motor to be continuously operated. Conversely, when a change in phase is desired, the speed of the electric motor is increased or decreased as needed to induce the appropriate motion on the gear drive mechanism which will result in achieving the desired change in phase relationship. However, it may be desirable to only operate the electric motor, without the need for slip rings, when a change in phase is desired.

What is needed is a camshaft phaser which minimizes or eliminates one or more of the shortcomings as set forth above. What is also needed is an actuator which minimizes or eliminates one or more of the shortcomings as set forth above.

SUMMARY OF THE INVENTION

Briefly described, a camshaft phaser is provided for use with an internal combustion engine for controllably varying the phase relationship between a crankshaft and a camshaft in the internal combustion engine. The camshaft phaser includes a camshaft phaser input member connectable to the crankshaft of the internal combustion engine to provide a fixed ratio of rotation between the camshaft phaser input member and the crankshaft; a camshaft phaser output member connectable to the camshaft of the internal combustion engine; an intermediate member rotatable relative to the camshaft phaser input member such that rotation of the intermediate member relative to the camshaft phaser input member causes the camshaft phaser output member to rotate relative to the camshaft phaser input member; and a rotational actuator configured to selectively rotate the intermediate member relative to the camshaft phaser input member. The rotational actuator includes a compound planetary gear set centered about a planetary gear set axis and having an input planetary gear set driven by the camshaft phaser input member and an output planetary gear set driven by the input planetary gear set; and an adjusting actuator connected to the compound planetary gear set and being switchable between an idling state and an adjusting state, wherein the idling state causes the intermediate member to be rotated together with the camshaft phaser input member in a one-to-one relationship through the compound planetary gear set and wherein the adjusting state causes the intermediate member to rotate relative to the camshaft phaser input member through the compound planetary gear set.

A rotational actuator is also provided for controllably varying the phase relationship between a first rotating member of a device and a second rotating member of the device. The rotational actuator includes a compound planetary gear set centered about a planetary gear set axis and having an input planetary gear set driven by the first rotating member and an output planetary gear set driven by the input planetary gear set; and an adjusting actuator connected to the compound planetary gear set and being switchable between an idling state and an adjusting state, wherein the idling state causes the second rotating member to be rotated together with the first rotating member in a one-to-one relationship through the compound planetary gear set and wherein the adjusting state causes the second rotating member to rotate relative to the first rotating member through the compound planetary gear set.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

This invention will be further described with reference to the accompanying drawings in which.

DETAILED DESCRIPTION OF INVENTION

Figure 1:
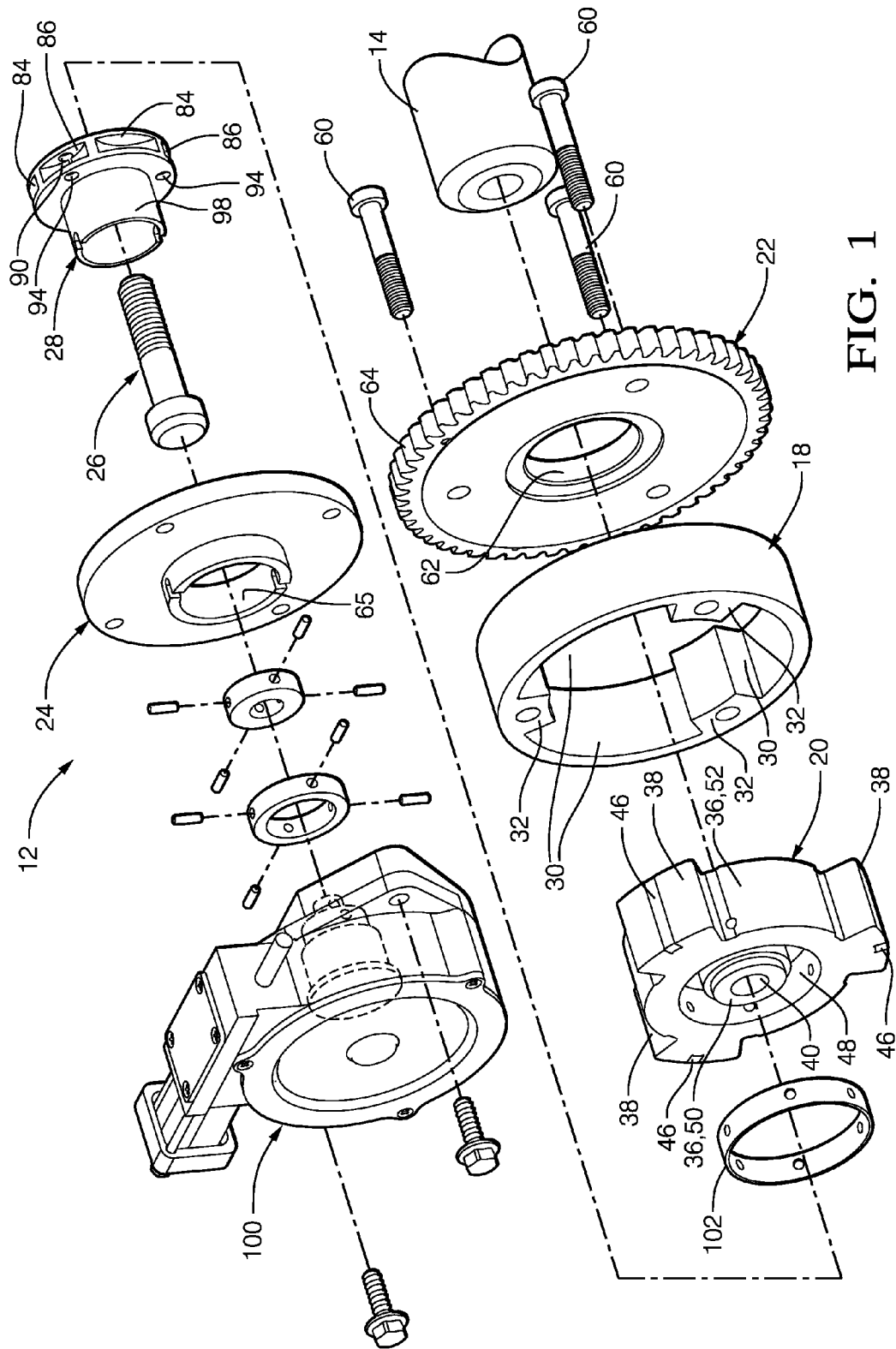
FIG. 1 is an exploded isometric view of a camshaft phaser in accordance with the present invention.
Figure 2:
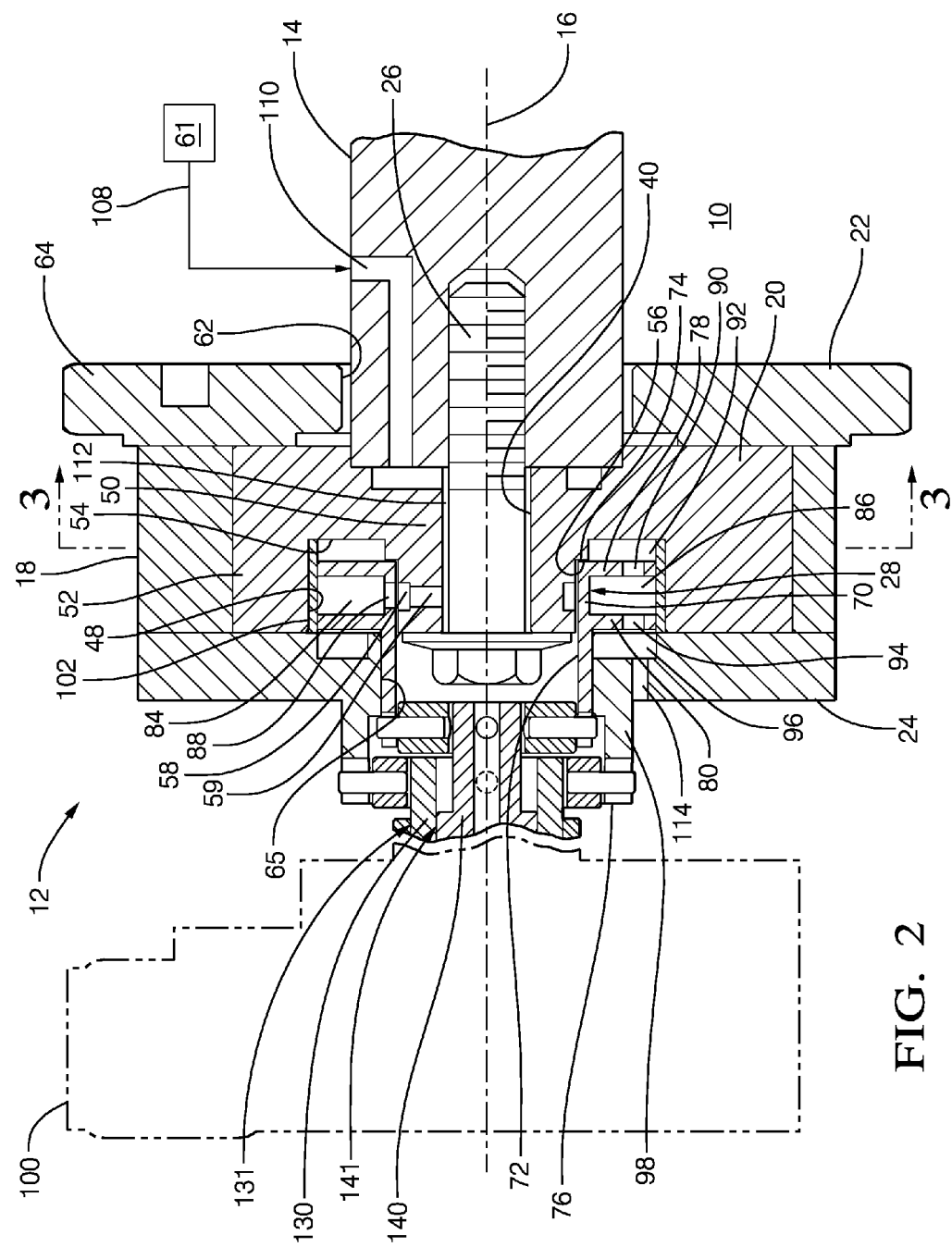
FIG. 2 is an axial cross-section view of the camshaft phaser of FIG. 1.
Figure 3:
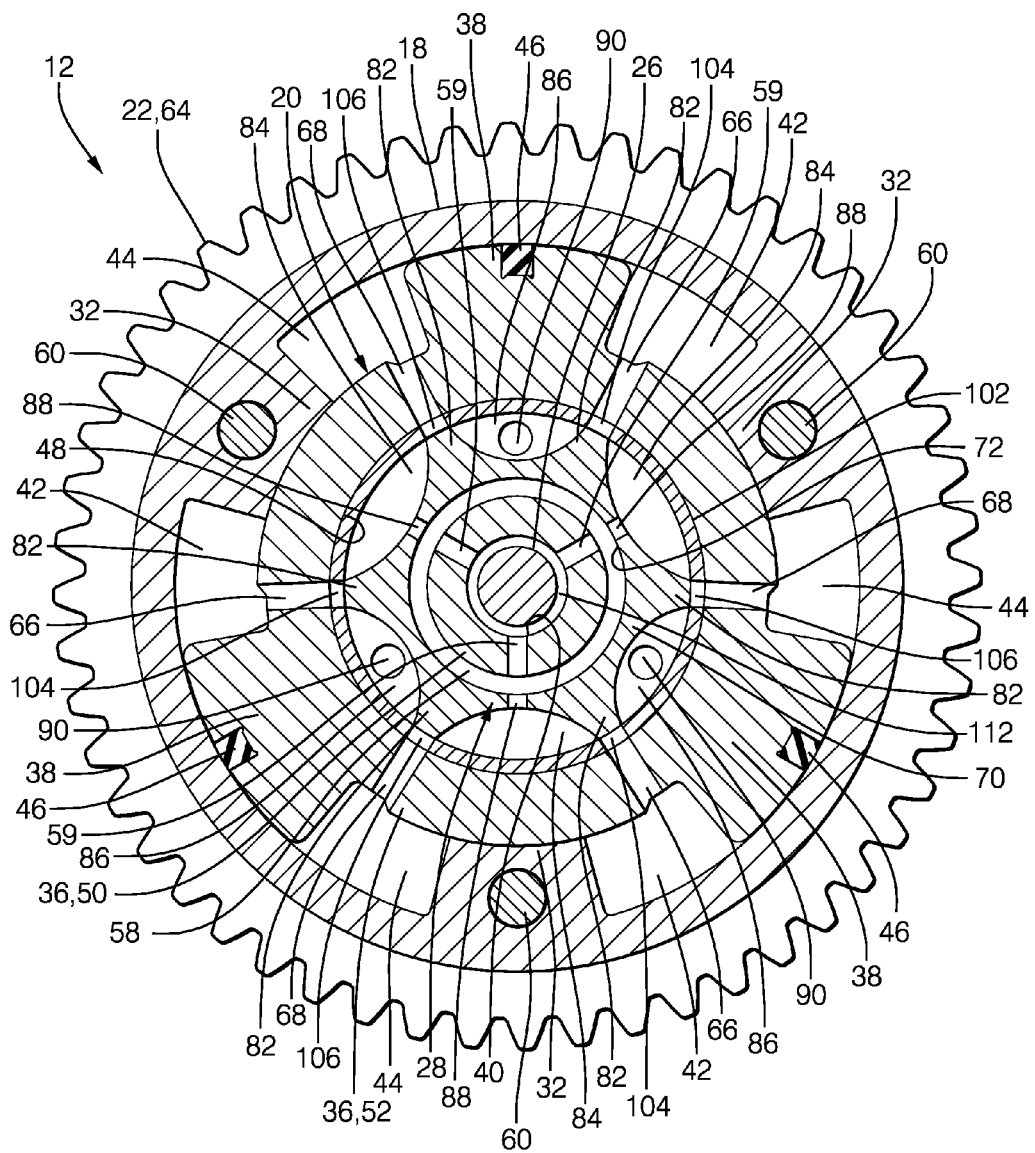
FIG. 3 is a radial cross-sectional view of the camshaft phaser taken through section line 3-3 of FIG. 2 and showing a valve spool of the camshaft phaser in a hold position which maintains a rotational position of a rotor of the camshaft phaser relative to a stator of the camshaft phaser.

In accordance with a preferred embodiment of this invention and referring to FIGS. 1-3, an internal combustion engine 10 is shown which includes a camshaft phaser 12. Internal combustion engine 10 also includes a camshaft 14 which is rotatable about a camshaft axis 16 based on rotational input from a crankshaft and chain (not shown) driven by a plurality of reciprocating pistons (also not shown). As camshaft 14 is rotated, it imparts valve lifting and closing motion to intake and/or exhaust valves (not shown) as is well known in the internal combustion engine art. Camshaft phaser 12 allows the timing or phase between the crankshaft and camshaft 14 to be varied. In this way, opening and closing of the intake and/or exhaust valves can be advanced or retarded in order to achieve desired engine performance.

Camshaft phaser 12 generally includes a stator 18 which acts as a camshaft phaser input member, a rotor 20 disposed coaxially within stator 18 which acts as a camshaft phaser output member, a back cover 22 closing off one axial end of stator 18, a front cover 24 closing off the other axial end of stator 18, a camshaft phaser attachment bolt 26 for attaching camshaft phaser 12 to camshaft 14, and a valve spool 28 which acts as an intermediate member. The rotational position of valve spool 28 relative to stator 18 determines the rotational position of rotor 20 relative to stator 18, unlike typical valve spools which move axially to determine only the direction the rotor will rotate relative to the stator. The various elements of camshaft phaser 12 will be described in greater detail in the paragraphs that follow.

Stator 18 is generally cylindrical and includes a plurality of radial chambers 30 defined by a plurality of lobes 32 extending radially inward. In the embodiment shown, there are three lobes 32 defining three radial chambers 30, however, it is to be understood that a different number of lobes 32 may be provided to define radial chambers 30 equal in quantity to the number of lobes 32.

Rotor 20 includes a rotor central hub 36 with a plurality of vanes 38 extending radially outward therefrom and a rotor central through bore 40 extending axially therethrough. The number of vanes 38 is equal to the number of radial chambers 30 provided in stator 18. Rotor 20 is coaxially disposed within stator 18 such that each vane 38 divides each radial chamber 30 into advance chambers 42 and retard chambers 44. The radial tips of lobes 32 are mateable with rotor central hub 36 in order to separate radial chambers 30 from each other. Each of the radial tips of vanes 38 may include one of a plurality of wiper seals 46 to substantially seal adjacent advance chambers 42 and retard chambers 44 from each other. While not shown, each of the radial tips of lobes 32 may also include one of a plurality of wiper seals 46.

Rotor central hub 36 defines an annular valve spool recess 48 which extends part way into rotor central hub 36 from the axial end of rotor central hub 36 that is proximal to front cover 24. As a result, rotor central hub 36 includes a rotor central hub inner portion 50 that is annular in shape and bounded radially inward by rotor central through bore 40 and bounded radially outward by annular valve spool recess 48. Also as a result, rotor central hub 36 includes a rotor central hub outer portion 52 that is bounded radially inward by annular valve spool recess 48 and is bounded radially outward by the radially outward portion of rotor central hub outer portion 52 from which lobes 32 extend radially outward. Since annular valve spool recess 48 extends only part way into rotor central hub 36, annular valve spool recess 48 defines an annular valve spool recess bottom 54 which is annular in shape and extends between rotor central hub inner portion 50 and rotor central hub outer portion 52. As shown, valve spool recess bottom 54 may be stepped, thereby defining a valve spool recess shoulder 56 that is substantially perpendicular to camshaft axis 16. A rotor annular oil supply groove 58 is formed circumferentially on a radially outward surface of rotor central hub inner portion 50 such that a plurality of rotor oil supply passages 59 provides fluid communication between rotor central through bore 40 and rotor annular oil supply groove 58.

Back cover 22 is sealingly secured, using cover bolts 60, to the axial end of stator 18 that is proximal to camshaft 14. Tightening of cover bolts 60 prevents relative rotation between back cover 22 and stator 18. Back cover 22 includes a back cover central bore 62 extending coaxially therethrough. The end of camshaft 14 is received coaxially within back cover central bore 62 such that camshaft 14 is allowed to rotate relative to back cover 22. Back cover 22 may also include a sprocket 64 formed integrally therewith or otherwise fixed thereto. Sprocket 64 is configured to be driven by a chain that is driven by the crankshaft of internal combustion engine 10. Alternatively, sprocket 64 may be a pulley driven by a belt or other any other known drive member known for driving camshaft phaser 12 by the crankshaft. In an alternative arrangement, sprocket 64 may be integrally formed or otherwise attached to stator 18 rather than back cover 22.

Similarly, front cover 24 is sealingly secured, using cover bolts 60, to the axial end of stator 18 that is opposite back cover 22. Cover bolts 60 pass through back cover 22 and stator 18 and threadably engage front cover 24; thereby clamping stator 18 between back cover 22 and front cover 24 to prevent relative rotation between stator 18, back cover 22, and front cover 24. In this way, advance chambers 42 and retard chambers 44 are defined axially between back cover 22 and front cover 24. Front cover 24 includes a front cover central bore 65 extending coaxially therethrough.

Camshaft phaser 12 is attached to camshaft 14 with camshaft phaser attachment bolt 26 which extends coaxially through rotor central through bore 40 of rotor 20 and threadably engages camshaft 14, thereby by clamping rotor 20 securely to camshaft 14. More specifically, rotor central hub inner portion 50 is clamped between the head of camshaft phaser attachment bolt 26 and camshaft 14. In this way, relative rotation between stator 18 and rotor 20 results in a change in phase or timing between the crankshaft of internal combustion engine 10 and camshaft 14.

Oil is selectively supplied to retard chambers 44 from an oil source 61, by way of non-limiting example only an oil pump of internal combustion engine 10 which may also provide lubrication to various elements of internal combustion engine 10, and vented from advance chambers 42 in order to cause relative rotation between stator 18 and rotor 20 which results in advancing the timing of camshaft 14 relative to the crankshaft of internal combustion engine 10. Conversely, oil is selectively supplied to advance chambers 42 from oil source 61 and vented from retard chambers 44 in order to cause relative rotation between stator 18 and rotor 20 which results in retarding the timing of camshaft 14 relative to the crankshaft of internal combustion engine 10. Rotor advance passages 66 may be provided in rotor 20 for supplying and venting oil to and from advance chambers 42 while rotor retard passages 68 may be provided in rotor 20 for supplying and venting oil to and from retard chambers 44. Rotor advance passages 66 extend radially outward through rotor central hub outer portion 52 from annular valve spool recess 48 to advance chambers 42 while and rotor retard passages 68 extend radially outward through rotor central hub outer portion 52 from annular valve spool recess 48 to retard chambers 44. Supplying and venting oil to and from advance chambers 42 and retard chambers 44 is controlled by valve spool 28, as will be described in greater detail later, such that valve spool 28 is disposed coaxially and rotatably within annular valve spool recess 48.

Rotor 20 and valve spool 28, which act together to function as a valve, will now be described in greater detail with continued reference to FIGS. 1-3. Valve spool 28 includes a spool central hub 70 with a spool central through bore 72 extending coaxially therethrough. Valve spool 28 is received coaxially within annular valve spool recess 48, and consequently, valve spool 28 radially surrounds camshaft phaser attachment bolt 26. Spool central through bore 72 is sized to mate with rotor central hub inner portion 50 in a close sliding interface such that valve spool 28 is able to freely rotate on rotor central hub inner portion 50 while substantially preventing oil from passing between the interface of spool central through bore 72 and rotor central hub inner portion 50 and also substantially preventing radial movement of valve spool 28 within annular valve spool recess 48. Spool central hub 70 extends axially from a spool hub first end 74 which is proximal to rotor 20 to a spool hub second end 76 which is distal from rotor 20. Valve spool 28 also includes an annular spool base 78 which extends radially outward from spool central hub 70 at spool hub first end 74 such that annular spool base 78 axially abuts valve spool recess shoulder 56. Valve spool 28 also includes an annular spool top 80 which extends radially outward from spool central hub 70 such that annular spool top 80 axially abuts front cover 24 and such that annular spool top 80 is axially spaced from annular spool base 78. Consequently, annular spool base 78 and annular spool top 80 are captured axially between valve spool recess shoulder 56 and front cover 24 such that axial movement of valve spool 28 relative to rotor 20 is substantially prevented. A plurality of valve spool lands 82 extend radially outward from spool central hub 70 in a polar array such that valve spool lands 82 join annular spool base 78 and annular spool top 80, thereby defining a plurality of alternating supply chambers 84 and vent chambers 86 between annular spool base 78 and annular spool top 80. The number of valve spool lands 82 is equal to the sum of the number of advance chambers 42 and the number of retard chambers 44, and as shown in the figures of the described embodiment, there are six valve spool lands 82. Fluid communication between rotor annular oil supply groove 58 and supply chambers 84 is provided through respective spool supply passages 88 which extend radially outward through spool central hub 70 from spool central through bore 72 to spool supply passages 88. Annular spool base 78 includes inner vent passages 90 extending axially therethrough which provide fluid communication between respective vent chambers 86 and an annular volume 92 defined axially between annular valve spool recess bottom 54 and annular spool base 78. Similarly, annular spool top 80 includes outer vent passages 94 extending axially therethrough which provide fluid communication between respective vent chambers 86 and an annular front cover vent groove 96 formed on the axial face of front cover 24 that faces toward rotor 20. Valve spool 28 also includes a valve spool drive extension 98 which extends axially from annular spool top 80 and through front cover central bore 65. Valve spool drive extension 98 is arranged to engage an actuator 100 which is used to rotate valve spool 28 relative to stator 18 and rotor 20 as required to achieve a desired rotational position of rotor 20 relative to stator 18 as will be described in greater detail later. Actuator 100 may be controlled by an electronic controller (not shown) based on inputs from various sensors (not shown) which may provide signals indicative of, by way of non-limiting example only, engine temperature, ambient temperature, intake air flow, manifold pressure, exhaust constituent composition, engine torque, engine speed, throttle position, crankshaft position, and camshaft position. Based on the inputs from the various sensors, the electronic controller may determine a desired phase relationship between the crankshaft and camshaft 14, thereby commanding actuator 100 to rotate valve spool 28 relative to stator 18 and rotor 20 as required to achieve the desired rotational position of rotor 20 relative to stator 18. Actuator 100 will be described in greater detail later.

A valve spool ring 102 is located radially between valve spool 28 and the portion of annular valve spool recess 48 defined by rotor central hub outer portion 52. Valve spool ring 102 is fixed to rotor 20, for example only, by press fitting valve spool ring 102 with annular valve spool recess 48, such that relative rotation between valve spool ring 102 and rotor 20 is prevented. Valve spool ring 102 is sized to substantially prevent oil from passing between the interface between valve spool ring 102 and annular valve spool recess 48. Valve spool ring 102 includes a plurality of valve spool ring advance passages 104 and a plurality of valve spool ring retard passages 106 which extend radially therethrough. Each valve spool ring advance passage 104 is aligned with a respective rotor advance passage 66 while each valve spool ring retard passage 106 is aligned with a respective rotor retard passage 68. Each valve spool ring advance passage 104 and each valve spool ring retard passage 106 is sized to be equal to the width of valve spool lands 82, and the spacing between valve spool ring advance passages 104 and valve spool ring retard passages 106 matches the spacing between valve spool lands 82. Valve spool lands 82 engage the inner circumference of valve spool ring 102 to substantially prevent oil from passing between the interfaces of valve spool lands 82 and valve spool ring 102 while allowing valve spool 28 to rotate within valve spool ring 102 substantially uninhibited. Consequently, supply chambers 84 and vent chambers 86 are fluidly segregated and fluid communication into and out of advance chambers 42 and retard chambers 44 is substantially prevented when valve spool lands 82 are aligned with valve spool ring advance passages 104 and valve spool ring retard passages 106 to block valve spool ring advance passages 104 and valve spool ring retard passages 106.

Operation of camshaft phaser 12 will now be described with continued reference to FIGS. 1-3 and now with additional reference to FIGS. 4A-5D. The rotational position of rotor 20 relative to stator 18 is determined by the rotational position of valve spool 28 relative to stator 18. When the rotational position of rotor 20 relative to stator 18 is at a desired position to achieve desired operational performance of internal combustion engine 10, the rotational position of valve spool 28 relative to stator 18 is maintained constant by actuator 100. Consequently, a hold position as shown in FIG. 3 is defined when each valve spool land 82 is aligned with a respective valve spool ring advance passage 104 or a respective valve spool ring retard passage 106, thereby preventing fluid communication into and out of advance chambers 42 and retard chambers 44 and hydraulically locking the rotational position of rotor 20 relative to stator 18. In this way, the phase relationship between camshaft 14 and the crankshaft of internal combustion engine 10 is maintained.

Figure 4A:
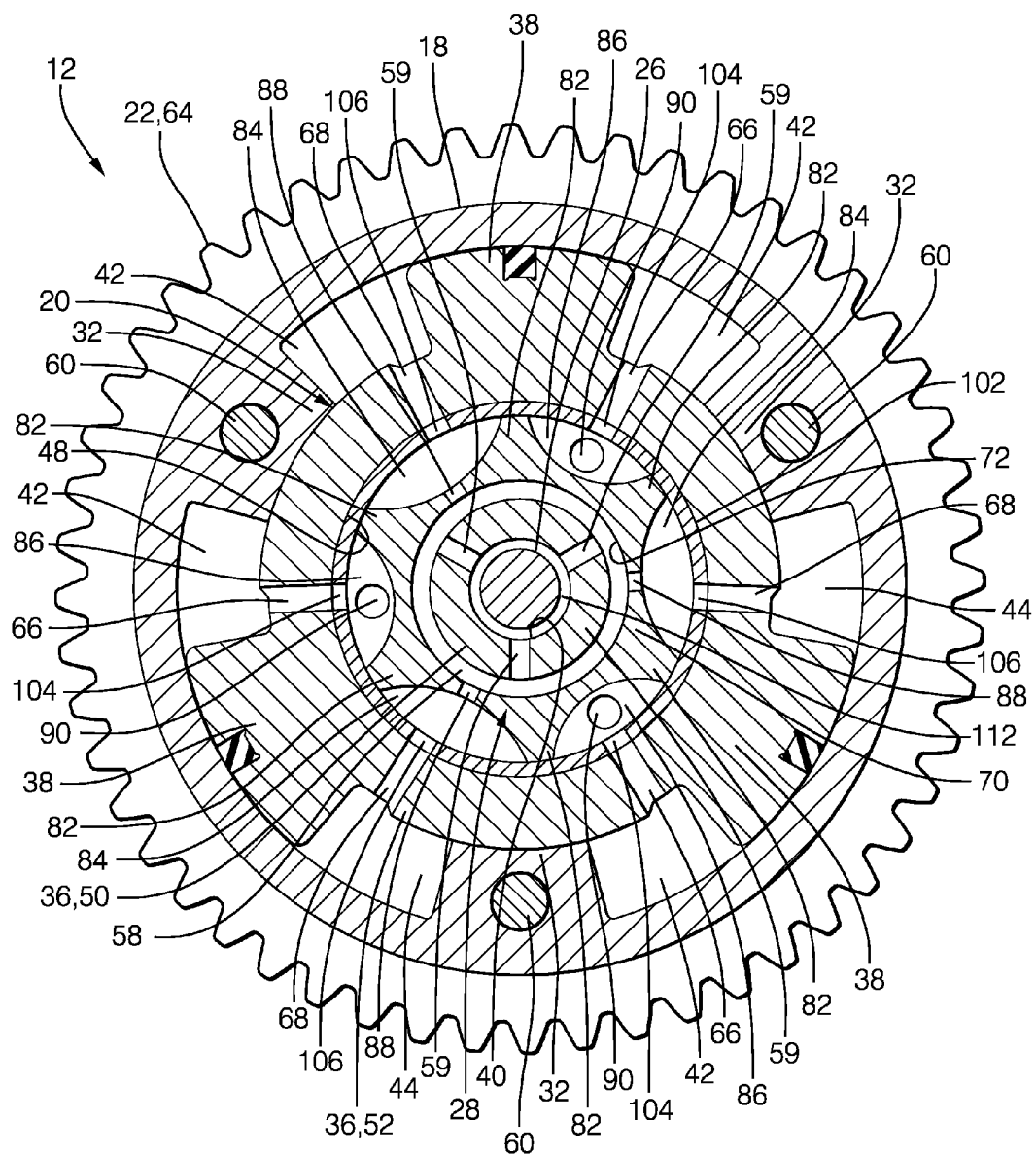
FIG. 4A is a radial cross-sectional view of the camshaft phaser showing the valve spool in a position which will result in a clockwise rotation of the rotor relative to the stator.
Figure 4B:
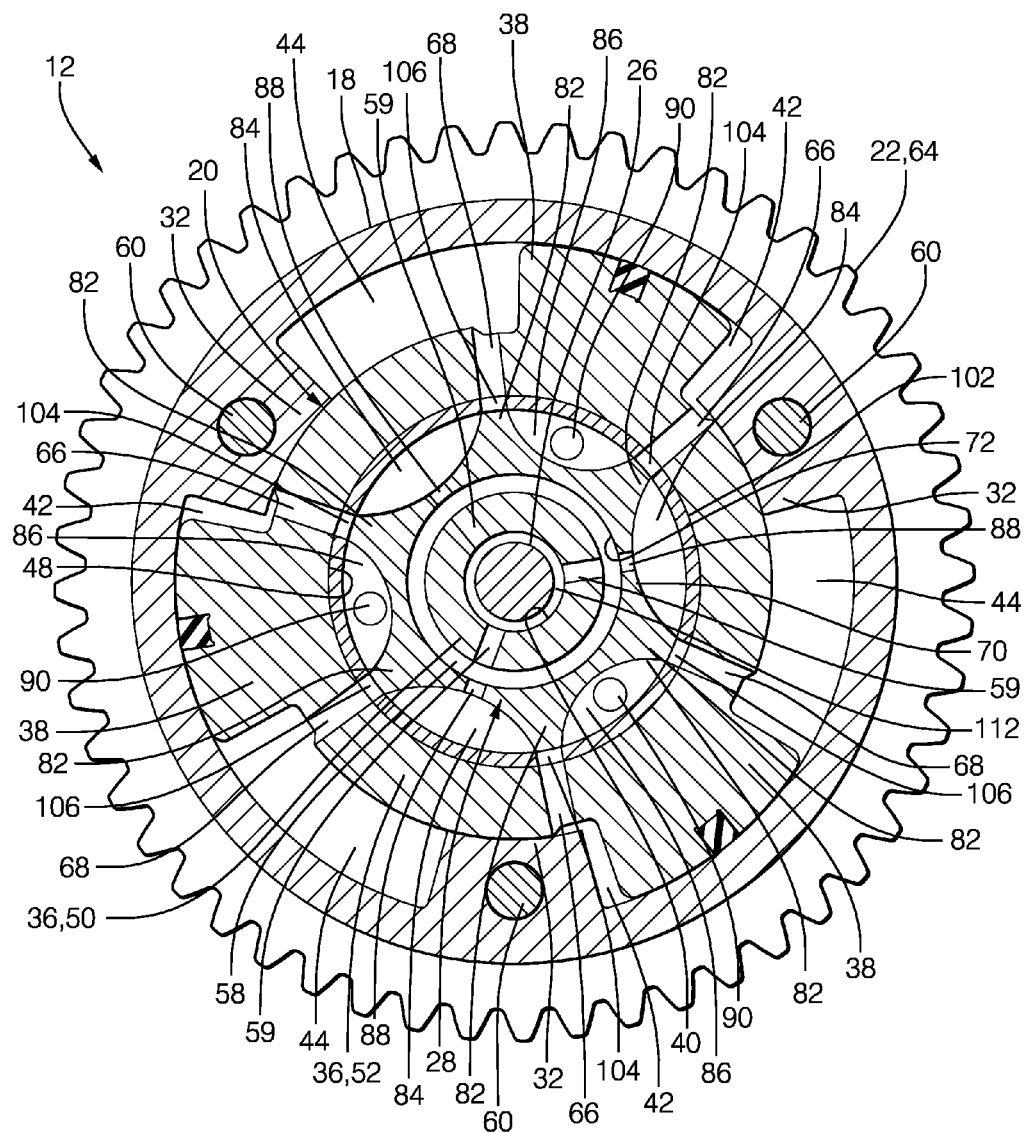
FIG. 4B is a radial cross-sectional view of the camshaft phaser showing the rotor after being rotated clockwise as a result of the position of the valve spool as shown in FIG. 4A.
Figure 4C:
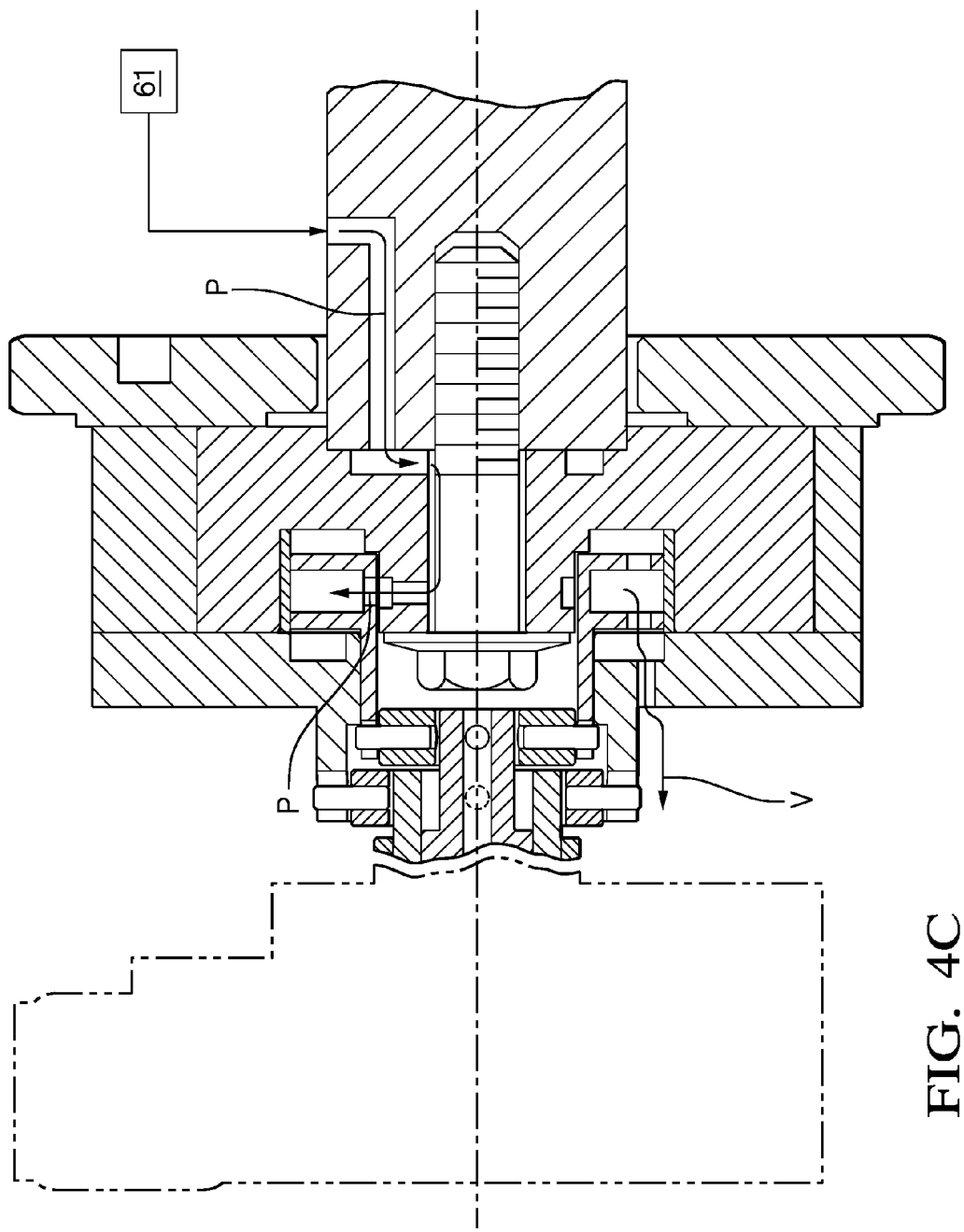
FIG. 4C is the axial cross-sectional view of FIG. 2 with reference numbers removed in order to clearly shown the path of oil flow as a result of the position of the valve spool as shown in FIG. 4A.
Figure 4D:
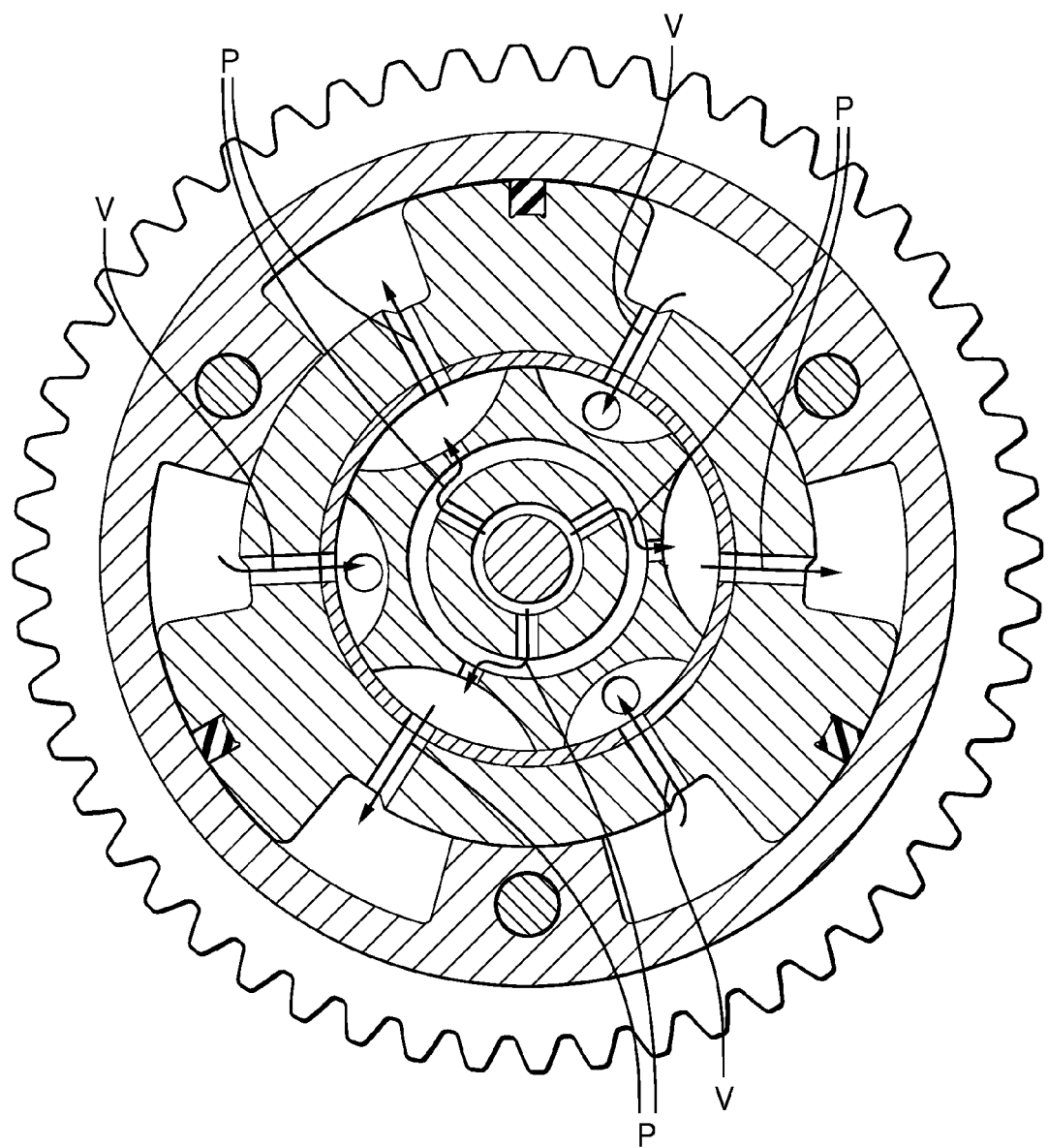
FIG. 4D is the radial cross-sectional view of FIG. 4A with reference numbers removed in order to clearly shown the path of oil flow as a result of the position of the valve spool as shown in FIG. 4A.

As shown in FIGS. 4A-4D, if a determination is made to advance the phase relationship between camshaft 14 and the crankshaft, it is necessary to rotate rotor 20 clockwise relative to stator 18 as viewed in the figures and as embodied by camshaft phaser 12. In order to rotate rotor 20 to the desired rotational position relative to stator 18, actuator 100 causes valve spool 28 to rotate clockwise relative to stator 18 to a rotational position of valve spool 28 relative to stator 18 that will also determine the rotational position of rotor 20 relative to stator 18. When valve spool 28 is rotated clockwise relative to stator 18, valve spool lands 82 are moved out of alignment with valve spool ring advance passages 104 and valve spool ring retard passages 106, thereby providing fluid communication between supply chambers 84 and retard chambers 44 and also between vent chambers 86 and advance chambers 42. Consequently, pressurized oil from oil source 61 is communicated to retard chambers 44 via an oil gallery 108 of internal combustion engine 10, a camshaft oil passage 110 formed in camshaft 14, an annular oil passage 112 formed radially between camshaft phaser attachment bolt 26 and rotor central through bore 40, rotor oil supply passages 59, rotor annular oil supply groove 58, spool supply passages 88, supply chambers 84, valve spool ring retard passages 106, and rotor retard passages 68. Also consequently, oil is vented out of camshaft phaser 12 from advance chambers 42 via rotor advance passages 66, valve spool ring advance passages 104, vent chambers 86, outer vent passages 94, annular front cover vent groove 96, and a front cover vent passage 114 which extends axially from annular front cover vent groove 96 to the axial face of front cover 24 that does not mate with rotor 20. Oil continues to be supplied to retard chambers 44 and vented from advance chambers 42 until rotor 20 is rotationally displaced sufficiently far for each valve spool land 82 to again align with respective valve spool ring advance passages 104 and valve spool ring retard passages 106 as shown in FIG. 4B, thereby again preventing fluid communication into and out of advance chambers 42 and retard chambers 44 and hydraulically locking the rotational position of rotor 20 relative to stator 18. In FIGS. 4C and 4D, which are the same cross-sectional views of FIGS. 2 and 4A respectively, the reference numbers have been removed for clarity, and arrows representing the path of travel of oil have been included where arrows P represent oil being supplied to retard chambers 44 from oil source 61 and arrows V represent oil being vented out of camshaft phaser 12 from advance chambers 42.

Figure 5A:
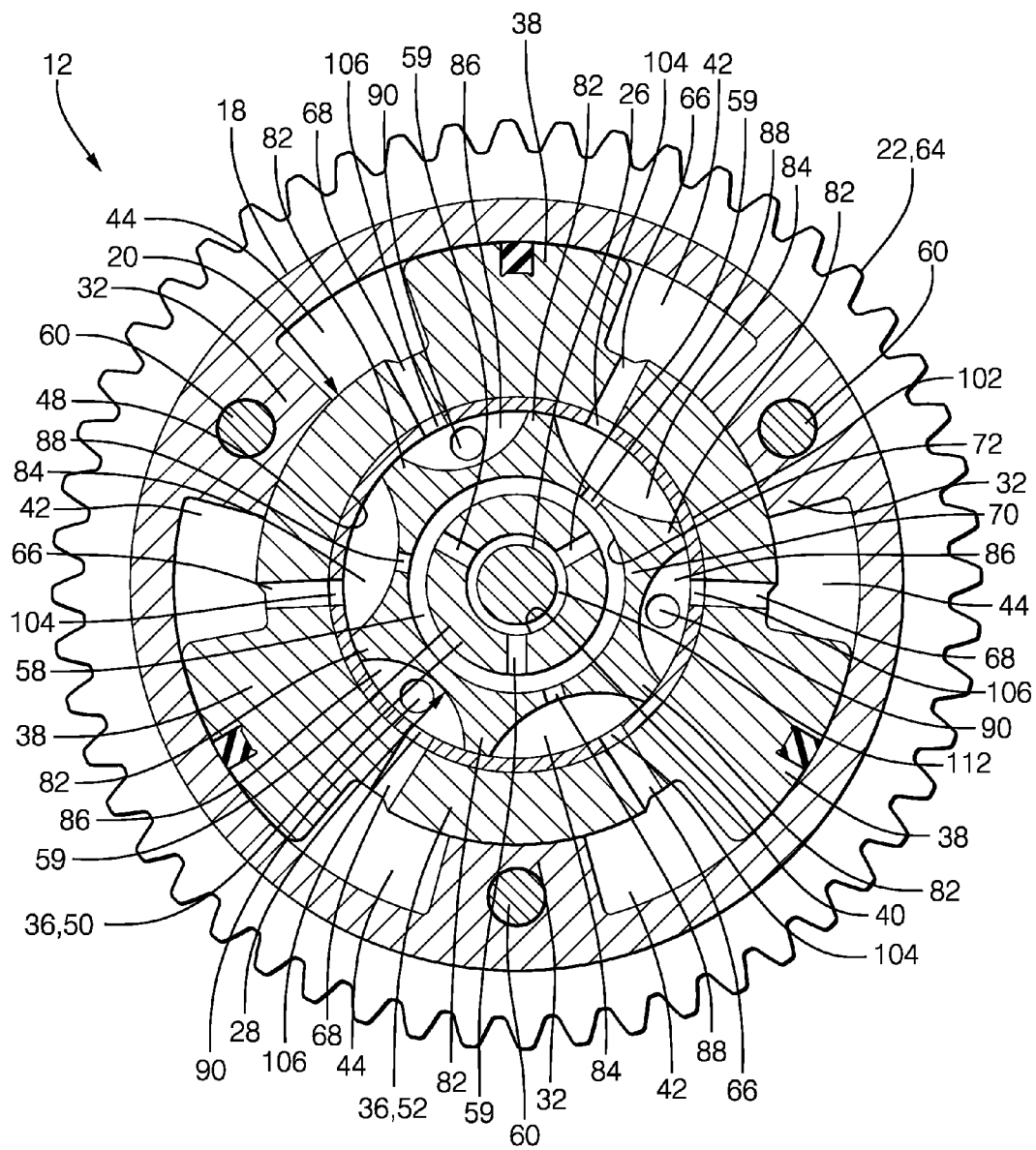
FIG. 5A is a radial cross-sectional view of the camshaft phaser showing the valve spool in a position which will result in a counterclockwise rotation of the rotor relative to the stator.
Figure 5B:
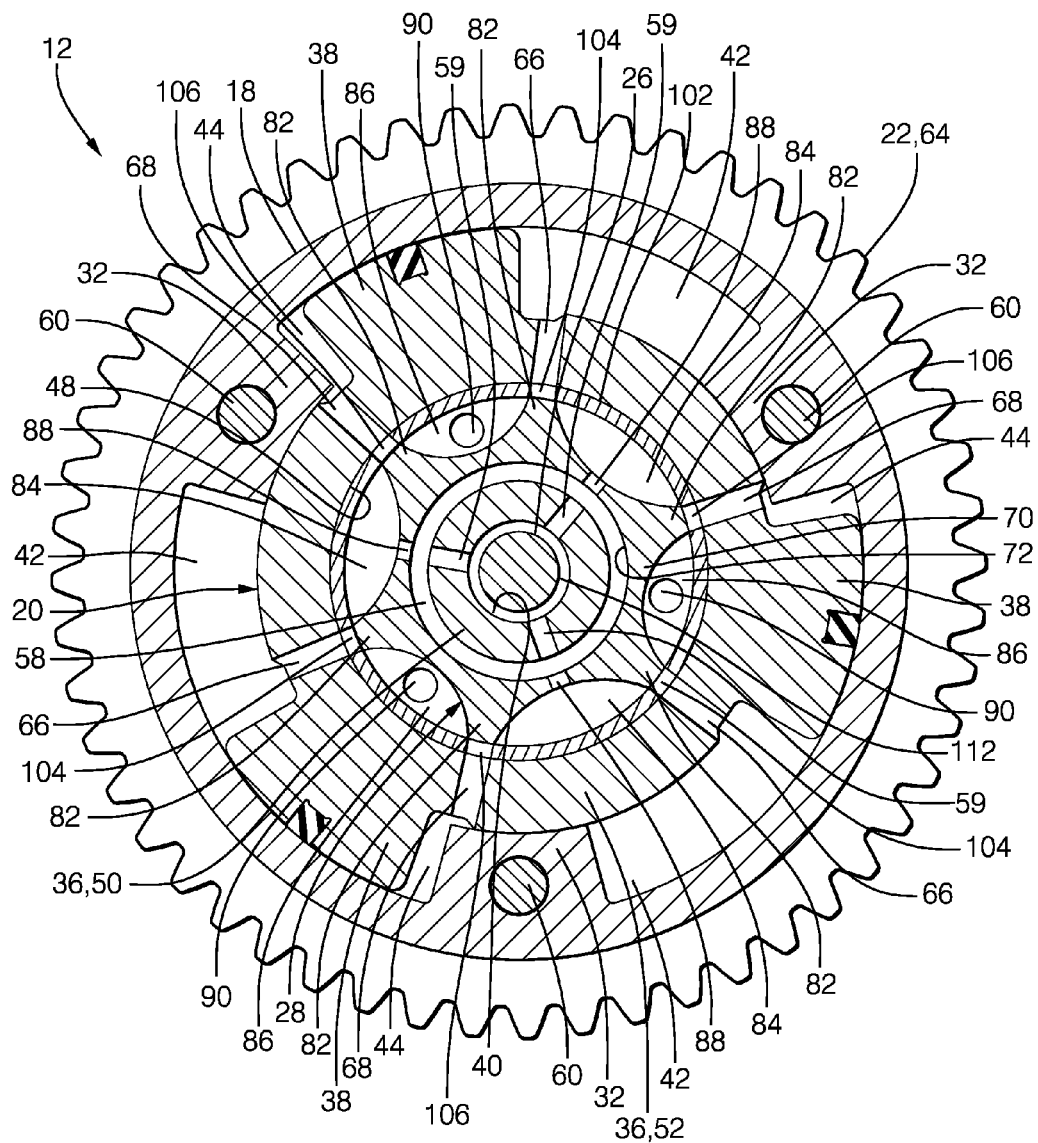
FIG. 5B is a radial cross-sectional view of the camshaft phaser showing the rotor after being rotated counterclockwise as a result of the position of the valve spool as shown in FIG. 5A.
Figure 5C:
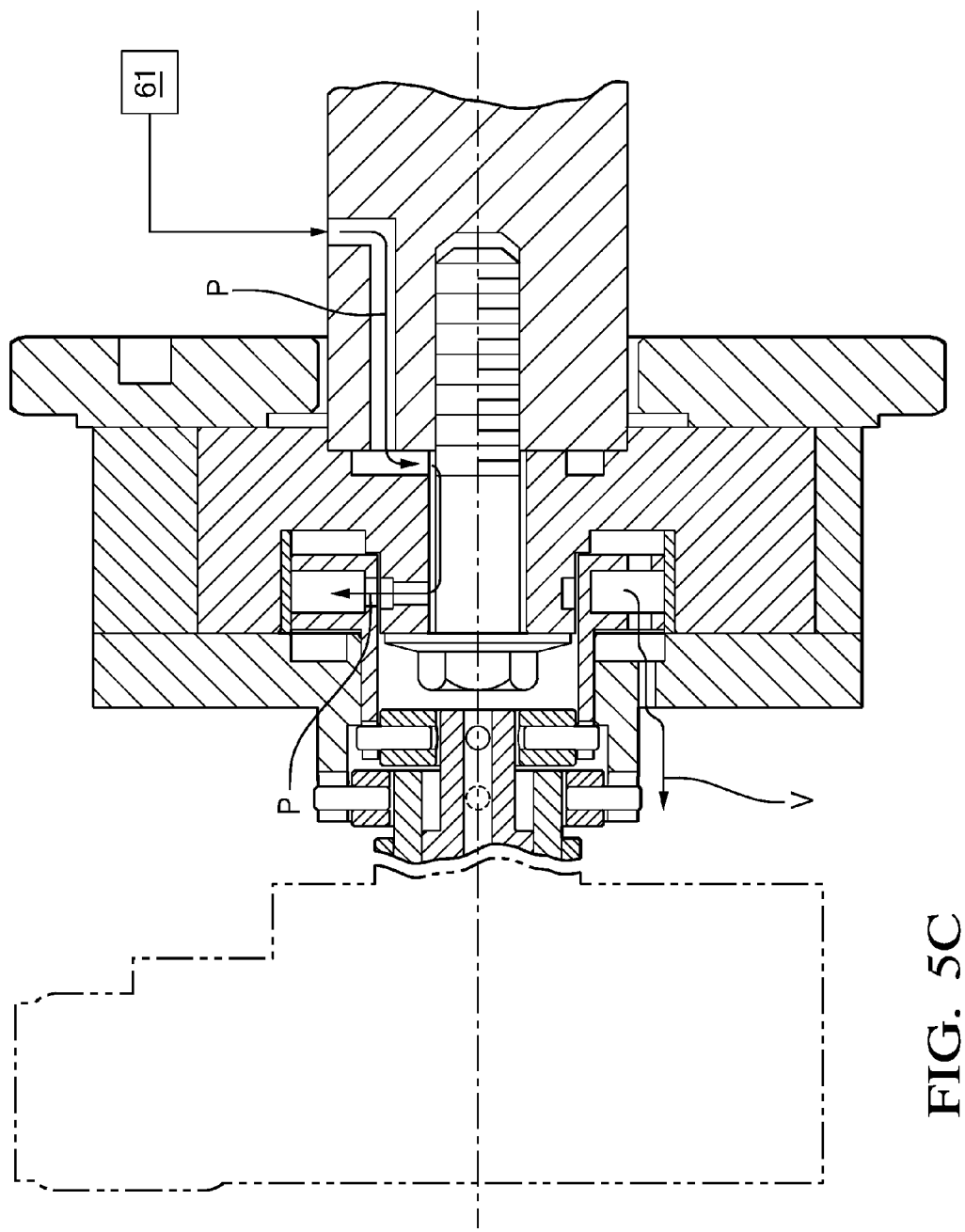
FIG. 5C is the axial cross-sectional view of FIG. 2 with reference numbers removed in order to clearly shown the path of oil flow as a result of the position of the valve spool as shown in FIG. 5A.
Figure 5D:
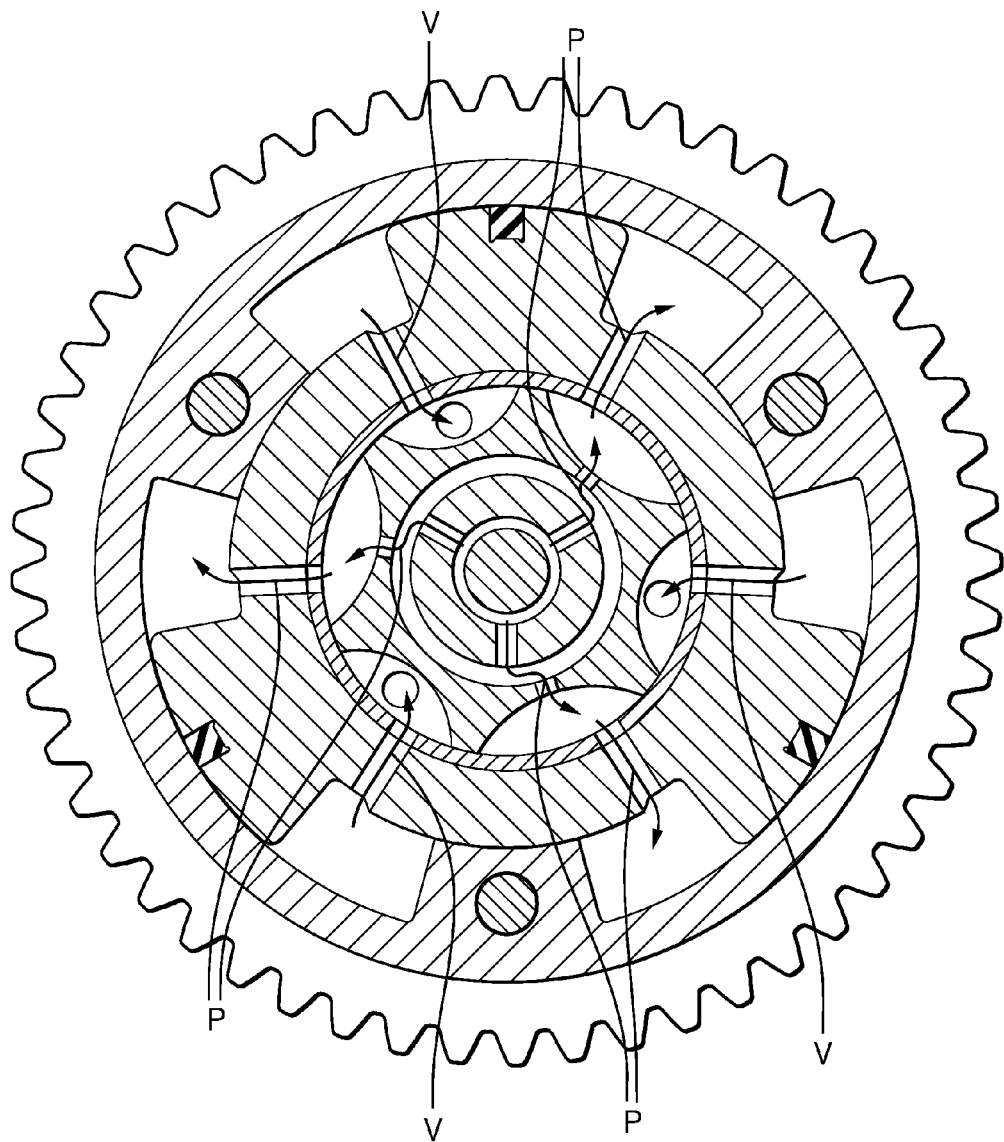
FIG. 5D is the radial cross-sectional view of FIG. 5A with reference numbers removed in order to clearly shown the path of oil flow as a result of the position of the valve spool as shown in FIG. 5A.

Conversely, as shown in FIGS. 5A-5D, if a determination is made to retard the phase relationship between camshaft 14 and the crankshaft, it is necessary to rotate rotor 20 counterclockwise relative to stator 18 as viewed in the figures and as embodied by camshaft phaser 12. In order to rotate rotor 20 to the desired rotational position relative to stator 18, actuator 100 causes valve spool 28 to rotate counterclockwise relative to stator 18 to a rotational position of valve spool 28 relative to stator 18 that will also determine the rotational position of rotor 20 relative to stator 18. When valve spool 28 is rotated counterclockwise relative to stator 18, valve spool lands 82 are moved out of alignment with valve spool ring advance passages 104 and valve spool ring retard passages 106, thereby providing fluid communication between supply chambers 84 and advance chambers 42 and also between vent chambers 86 and retard chambers 44. Consequently, pressurized oil from oil source 61 is communicated to advance chambers 42 via oil gallery 108, camshaft oil passage 110, annular oil passage 112, rotor oil supply passages 59, rotor annular oil supply groove 58, spool supply passages 88, supply chambers 84, valve spool ring advance passages 104, and rotor advance passages 66. Also consequently, oil is vented out of camshaft phaser 12 from retard chambers 44 via rotor retard passages 68, valve spool ring retard passages 106, vent chambers 86, outer vent passages 94, annular front cover vent groove 96, and front cover vent passage 114. Oil continues to be supplied to advance chambers 42 and vented from retard chambers 44 until rotor 20 is rotationally displaced sufficiently far for each valve spool land 82 to again align with respective valve spool ring advance passages 104 and valve spool ring retard passages 106 as shown in FIG. 5B, thereby again preventing fluid communication into and out of advance chambers 42 and retard chambers 44 and hydraulically locking the rotational position of rotor 20 relative to stator 18. In FIGS. 5C and 5D, which are the same cross-sectional views as FIGS. 2 and 5A respectively, the reference numbers have been removed for clarity, and arrows representing the path of travel of oil have been included where arrows P represent oil being supplied to advance chambers 42 from oil source 61 and arrows V represent oil being vented out of camshaft phaser 12 from retard chambers 44.

In operation, the actual rotational position of rotor 20 relative to stator 18 may drift over time from the desired rotational position of rotor 20 relative to stator 18, for example only, due to leakage from advance chambers 42 and/or retard chambers 44. Leakage from advance chambers 42 and/or retard chambers 44 may be the result of, by way of non-limiting example only, manufacturing tolerances or wear of the various components of camshaft phaser 12. An important benefit of valve spool 28 is that valve spool 28 allows for self-correction of the rotational position of rotor 20 relative to stator 18 if the rotational position of rotor 20 relative to stator 18 drifts from the desired rotational position of rotor 20 relative to stator 18. Since the rotational position of valve spool 28 relative to stator 18 is locked by actuator 100, valve spool ring advance passages 104 and valve spool ring retard passages 106 will be moved out of alignment with valve spool lands 82 when rotor 20 drifts relative to stator 18. Consequently, pressurized oil will be supplied to advance chambers 42 or retard chambers 44 and oil will be vented from advance chambers 42 or retard chambers 44 as necessary to rotate rotor 20 relative to stator 18 to correct for the drift until each valve spool land 82 is again aligned with respective valve spool ring advance passages 104 and valve spool ring retard passages 106.

It should be noted that inner vent passages 90 do not contribute to venting oil from advance chambers 42 or retard chambers 44. Instead, inner vent passages 90 ensure that opposing axial ends of valve spool 28 are at a common pressure, thereby preventing hydraulic pressure from applying an axial load to valve spool 28.

While camshaft phaser 12 has been described as including valve spool ring 102, it should now be understood that valve spool ring 102 may be omitted. If valve spool ring 102 is omitted, then valve spool lands 82 interface directly with the surface of annular valve spool recess 48 defined by rotor central hub outer portion 52. Furthermore, rotor advance passages 66 and rotor retard passages 68 need to be equal to the width of valve spool lands 82 when valve spool ring 102 is omitted, and the spacing between rotor advance passages 66 and rotor retard passages 68 matches the spacing between valve spool lands 82.

Figure 6:
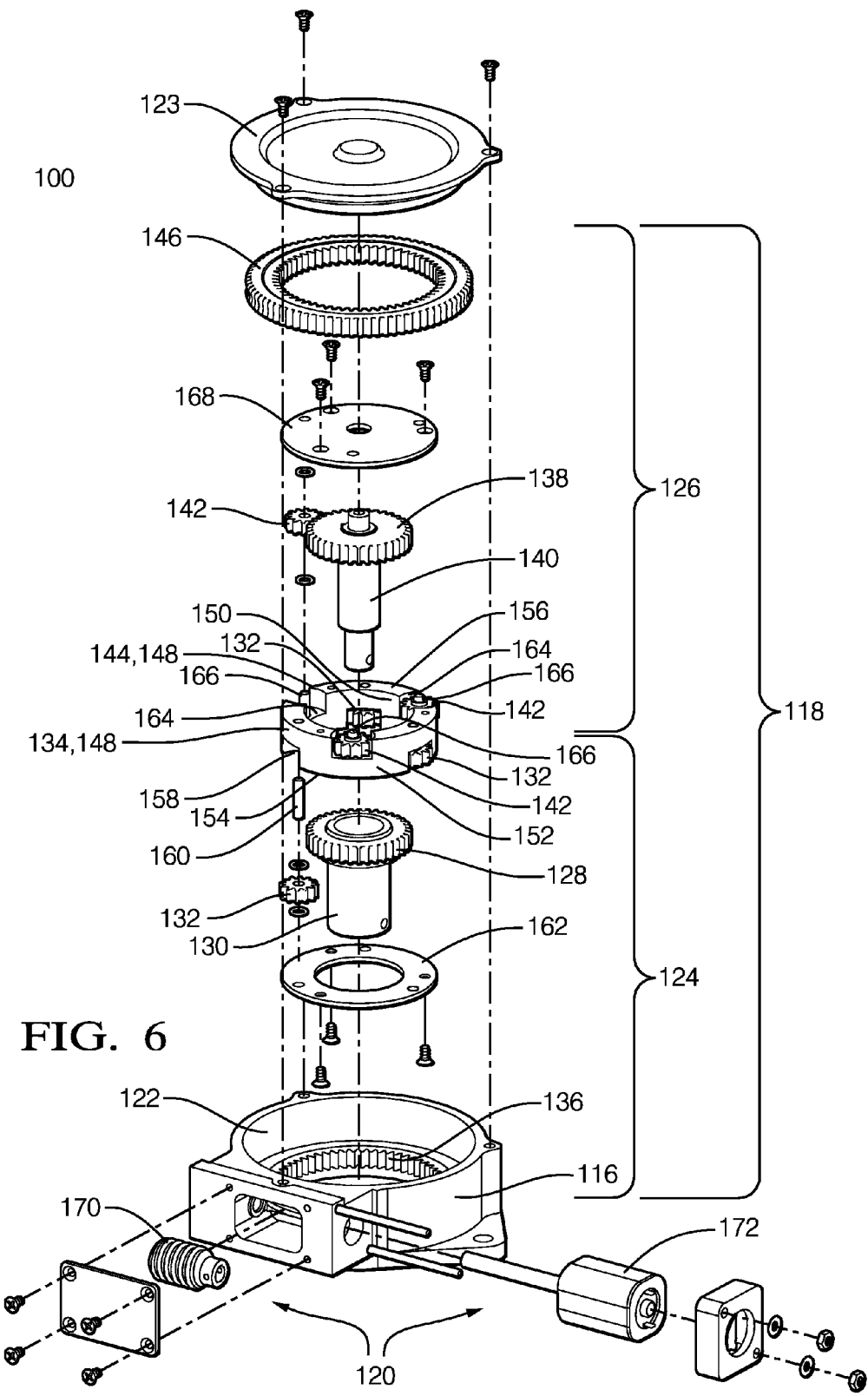
FIG. 6 is an exploded isometric view of an actuator of the camshaft phaser in accordance with the present invention.
Figure 7:
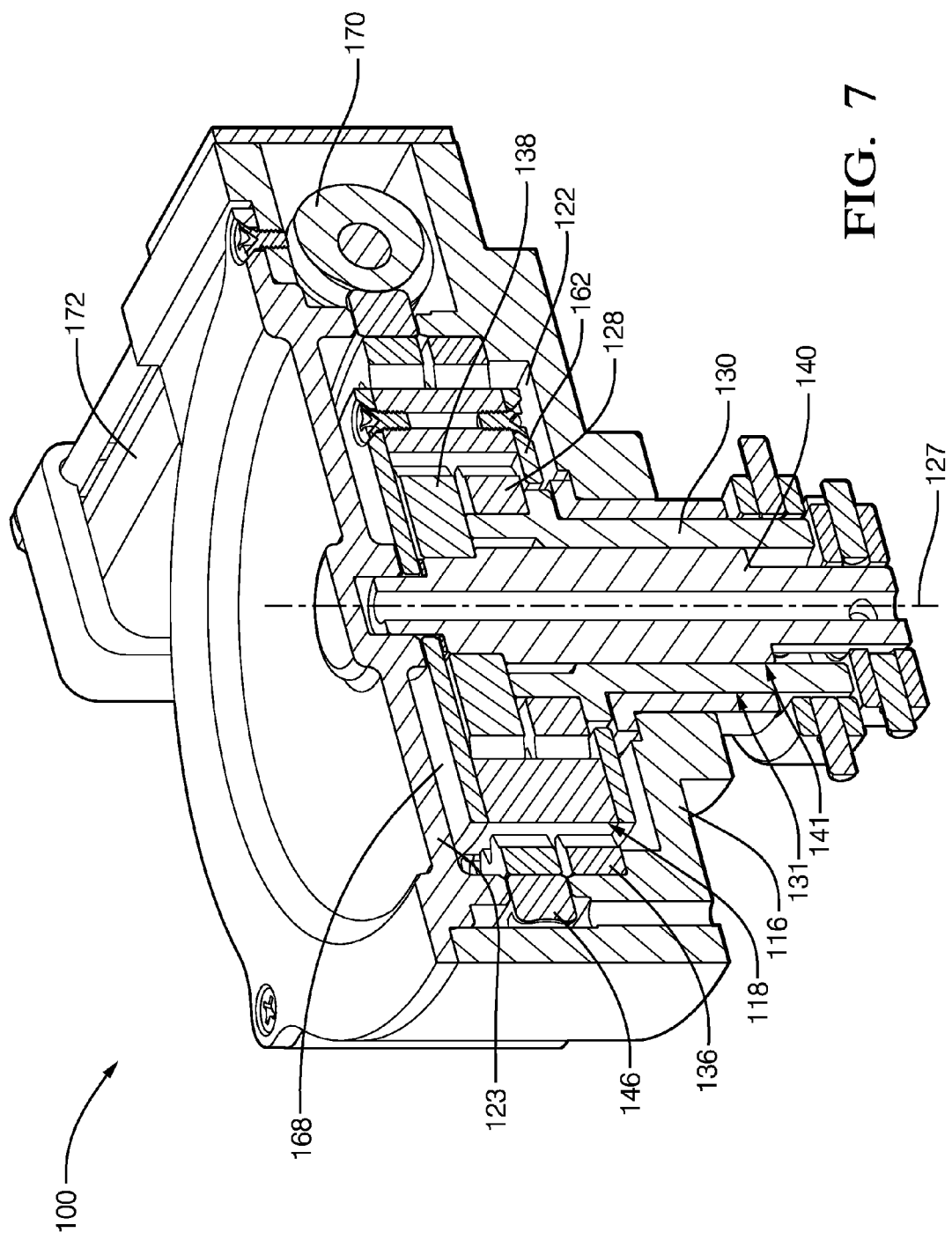
FIG. 7 is an isometric axial cross-sectional view of the actuator of FIG. 6.

Actuator 100 will now be described with continued reference to FIGS. 1 and 2 and now with additional reference to FIGS. 6 and 7. Actuator 100 includes an actuator housing 116, a compound planetary gear set 118, and an adjusting actuator 120. Actuator housing 116 is fixed to internal combustion engine 10 such that actuator housing 116 is held stationary relative to internal combustion engine 10. Actuator housing 116 defines a gear compartment 122 within which compound planetary gear set 118 is received such that compound planetary gear set 118 is connected to stator 18 and valve spool 28 as will be described in the paragraphs that follow. Actuator housing 116 includes a housing cover 123 which closes off gear compartment 122. Adjusting actuator 120, which will be described in greater detail later, is mounted in fixed relationship to actuator housing 116 and is connected to compound planetary gear set 118 for selectively rotating valve spool 28 relative to stator 18 through compound planetary gear set 118 as will also be described in greater detail later below.

Compound planetary gear set 118 includes an input planetary gear set 124 which is connected to, and driven by, stator 18 and also includes an output planetary gear set 126 which is driven by input planetary gear set 124 and which is connected to, and drives, valve spool 28. Input planetary gear set 124 and output planetary gear set 126 are centered about a planetary gear set axis 127 which is generally coincident with camshaft axis 16, although, some mismatch may be permitted. As embodied herein, input planetary gear set 124 and output planetary gear set 126 have gear ratios that are equal. Input planetary gear set 124 includes an input sun gear 128 having an input planetary gear set input shaft 130 which is fixed to input sun gear 128, thereby preventing relative rotation between input sun gear 128 and input planetary gear set input shaft 130. Input planetary gear set input shaft 130 is coupled to stator 18 such that relative rotation between input planetary gear set input shaft 130 and stator 18 is prevented. Input planetary gear set input shaft 130 may be coupled to stator 18, by way of non-limiting example only, by engaging complementary features between input planetary gear set input shaft 130 and front cover 24 which may be, also by way of non-limiting example, an Oldham coupling which allows some mismatch between planetary gear set axis 127 and camshaft axis 16. In this way, input sun gear 128 rotates together with stator 18 in a one-to-one relationship about planetary gear set axis 127. Input planetary gear set input shaft 130 may form a first journal bearing interface 131 with actuator housing 116 where input planetary gear set input shaft 130 passes through actuator housing 116. First journal bearing interface 131 substantially prevents radial movement of input planetary gear set input shaft 130 while allowing input planetary gear set input shaft 130 to rotate freely relative to actuator housing 116. Input planetary gear set 124 also includes a plurality of input planet gears 132 which radially surround input sun gear 128 such that outwardly extending gear teeth of input planet gears 132 mesh with outward extending gear teeth of input sun gear 128. Input planet gears 132 are mounted on an input carrier 134 which is able to rotate relative to input sun gear 128 about planetary gear set axis 127. Input carrier 134 will be described in greater detail later. Input planetary gear set 124 also includes an input ring gear 136 that is coaxial with input sun gear 128 such that input ring gear 136 radially surrounds input planet gears 132 and such that inward extending gear teeth of input ring gear 136 mesh with the outward extending gear teeth of input planet gears 132. Input ring gear 136 is fixed to actuator housing 116, by way of non-limiting example only, by press fitting input ring gear 136 within gear compartment 122 such that relative rotation between input ring gear 136 and actuator housing 116 is prevented.

Output planetary gear set 126 includes an output sun gear 138 which has an output planetary gear set output shaft 140 which is fixed to output sun gear 138, thereby preventing relative rotation between output sun gear 138 and output planetary gear set output shaft 140. Output planetary gear set output shaft 140 is coupled to valve spool 28 such that relative rotation between output planetary gear set output shaft 140 and valve spool 28 is prevented. Output planetary gear set output shaft 140 extends coaxially through input planetary gear set input shaft 130 such that output planetary gear set output shaft 140 forms a second journal bearing interface 141 with input planetary gear set input shaft 130. Second journal bearing interface 141 substantially prevents radial movement of output planetary gear set output shaft 140 while allowing output planetary gear set output shaft 140 to rotate freely relative to input planetary gear set input shaft 130 about planetary gear set axis 127 and also relative to actuator housing 116. Output planetary gear set output shaft 140 may be coupled to valve spool 28, by way of non-limiting example only, by engaging complementary features between output planetary gear set output shaft 140 and valve spool drive extension 98 which may be, also by way of non-limiting example, an Oldham coupling which allows some mismatch between planetary gear set axis 127 and camshaft axis 16. In this way, output sun gear 138 rotates together with valve spool 28 in a one-to-one relationship. Output planetary gear set 126 also includes a plurality of output planet gears 142 which radially surround output sun gear 138 such that outwardly extending gear teeth of output planet gears 142 mesh with outward extending gear teeth of output sun gear 138. Output planet gears 142 are mounted on an output carrier 144 which is coupled to input carrier 134 to rotate together with input carrier 134 in a one-to-one relationship about planetary gear set axis 127. Output carrier 144 will be described in greater detail later. Output planetary gear set 126 also includes an output ring gear 146 that is coaxial with output sun gear 138 such that output ring gear 146 radially surrounds output planet gears 142 and such that inward extending gear teeth of output ring gear 146 mesh with the outward extending gear teeth of output planet gears 142.

As illustrated herein, input carrier 134 and output carrier 144 are coupled together by sharing a common carrier body 148 that is annular in shape such that carrier body 148 extends radially outward from a carrier body inner surface 150 to a carrier body outer surface 152. Carrier body 148 also extends axially from a carrier body first end 154 to a carrier body second end 156. A plurality of carrier body input planet gear recesses 158 extend part way axially into carrier body 148 from carrier body first end 154 such that each carrier body input planet gear recess 158 extends from carrier body inner surface 150 to carrier body outer surface 152. Each carrier body input planet gear recess 158 includes an input planet gear axle 160 (only one input planet gear axle 160 is visible in FIG. 6) extending axially therefrom such that each input planet gear axle 160 is substantially parallel to planetary gear set axis 127. Each input planet gear axle 160 passes through a respective input planet gear 132 such that radial movement of input planet gears 132 on input planet gear axles 160 is substantially prevented while allowing input planet gears 132 to freely rotate on input planet gear axles 160 within carrier body input planet gear recesses 158. Input planet gears 132 are retained within carrier body input planet gear recesses 158 by an input planet gear retainer 162 which is fixed to carrier body first end 154, by way of non-limiting example only, by screws which pass through input planet gear retainer 162 and threadably engage carrier body 148. In this way, input planet gears 132 are captured axially between the bottoms of carrier body input planet gear recesses 158 and input planet gear retainer 162. Input planet gear retainer 162 is annular in shape, thereby allowing input planetary gear set input shaft 130 to pass freely through the center of input planet gear retainer 162. Input planet gear retainer 162 is also used to support one end of input planet gear axles 160 while carrier body 148 supports the other end of input planet gear axles 160.

A plurality of carrier body output planet gear recesses 164 extend part way axially into carrier body 148 from carrier body second end 156 such that each carrier body output planet gear recess 164 extends from carrier body inner surface 150 to carrier body outer surface 152. Each carrier body output planet gear recess 164 is arranged so as to not be axially aligned with any of carrier body input planet gear recesses 158. Each carrier body output planet gear recess 164 includes an output planet gear axle 166 extending axially therefrom such that each output planet gear axle 166 is substantially parallel to planetary gear set axis 127. Each output planet gear axle 166 passes through a respective output planet gear 142 such that radial movement of output planet gears 142 on output planet gear axles 166 is substantially prevented while allowing output planet gears 142 to freely rotate on output planet gear axles 166 within carrier body output planet gear recesses 164. Output planet gears 142 are retained within carrier body output planet gear recesses 164 by an output planet gear retainer 168 which is fixed to carrier body second end 156, by way of non-limiting example only, by screws which pass through output planet gear retainer 168 and threadably engage carrier body 148. In this way, output planet gears 142 are captured axially between the bottoms of carrier body output planet gear recesses 164 and output planet gear retainer 168. Output planet gear retainer 168 is annular in shape, thereby allowing one end of output planetary gear set output shaft 140 to pass freely through the center of output planet gear retainer 168 to be supported by housing cover 123. Output planet gear retainer 168 is also used to support one end of output planet gear axles 166 while carrier body 148 supports the other end of output planet gear axles 166.

Adjusting actuator 120 includes an adjusting actuator gear 170 which meshes with outwardly extending gear teeth of output ring gear 146. Adjusting actuator 120 also includes an adjusting motor 172 which selectively rotates adjusting actuator gear 170, thereby causing output ring gear 146 to rotate. As shown, adjusting actuator gear 170 may be a worm gear, and consequently, output ring gear 146 is rotationally locked when adjusting actuator gear 170 is not rotated by adjusting motor 172. Also as shown, adjusting motor 172 may be a DC electric motor which is bidirectional in operation.

Operation of actuator 100 will now be described. When no change in phase relationship between camshaft 14 and the crankshaft of internal combustion engine 10 is desired, adjusting motor 172 is operated to prevent adjusting actuator gear 170 from rotating, for example, by applying no electric current to adjusting motor 172. Consequently, adjusting actuator gear 170 locks output ring gear 146 by the self-locking nature of adjusting actuator gear 170 which is a worm gear meshing with outward extending teeth of output ring gear 146. Input sun gear 128 is rotated together with stator 18 in a one-to-one relationship, and as a result of input sun gear 128 meshing with input planet gears 132, input planet gears 132 orbit input sun gear 128, thereby causing input carrier 134 to rotate about planetary gear set axis 127. Since input carrier 134 is coupled to output carrier 144, output carrier 144 rotates together with input carrier 134 in a one-to-one relationship about planetary gear set axis 127, thereby causing output planet gears 142 to rotate. Rotation of output planet gears 142 consequently causes output sun gear 138 to rotate, and since output sun gear 138 is coupled to output planetary gear set output shaft 140, output planetary gear set output shaft 140 rotates together with output sun gear 138 in a one-to-one relationship about planetary gear set axis 127. Furthermore, since output planetary gear set output shaft 140 is coupled to valve spool 28, valve spool 28 rotates together with output planetary gear set output shaft 140 in a one-to-one relationship. Since input planetary gear set 124 and output planetary gear set 126 have gear ratios that are equal, valve spool 28 will be rotated at the same rate as stator 18, thereby maintaining the rotational position of valve spool 28 relative to stator 18, and also thereby maintaining the rotational position of rotor 20 relative to stator 18 as described previously relative to the operation of camshaft phaser 12. When no change in phase relationship between camshaft 14 and the crankshaft of internal combustion engine 10 is desired and adjusting motor 172 is operated to prevent adjusting actuator gear 170 from rotating, adjusting actuator 120 is said to be in and idling state where the idling state causes valve spool 28 to be rotated together with stator 18 in a one-to-one relationship through compound planetary gear set 118.

Conversely, when a change in phase relationship is desired between camshaft 14 and the crankshaft of internal combustion engine 10, adjusting motor 172 is operated to rotate adjusting actuator gear 170, for example, by applying an electric current to adjusting motor 172. When adjusting actuator gear 170 is rotated by adjusting motor 172, output ring gear 146 is caused to rotate about planetary gear set axis 127. Depending on the direction that adjusting actuator gear 170 is rotated, the rotation of output planet gears 142 speed up or slow down, thereby causing output sun gear 138 to also speed up or slow down for the duration of time that adjusting actuator gear 170 is rotated. Consequently, valve spool 28 is rotated clockwise relative to stator 18 when adjusting actuator gear 170 is rotated to speed up output planet gears 142, and conversely, valve spool 28 is rotated counterclockwise relative to stator 18 when adjusting actuator gear 170 is rotated to slow down output planet gears 142. Consequently, rotor 20 is rotated relative to stator 18 as a result of valve spool 28 being rotated relative to stator 18 as described previously relative to the operation of camshaft phaser 12. When a change in phase relationship is desired between camshaft 14 and the crankshaft of internal combustion engine 10 and adjusting motor 172 is operated to rotate adjusting actuator gear 170, adjusting actuator 120 is said to be in an adjusting state where the idling state causes valve spool 28 to rotate relative to stator 18 through compound planetary gear set 118.

As embodied herein, input sun gear 128 is coupled to stator 18 such that input sun gear 128 rotates together with stator 18 in a one-to-one relationship. Consequently, input sun gear 128 acts as an input planetary gear set input member. However, it should now be understood that the input planetary gear set input member could alternatively be input carrier 134 or input ring gear 136. It should be noted that if the input planetary gear set input member is input carrier 134, input carrier 134 needs to be separate from output carrier 144 such that input carrier 134 is able to rotate relative to output carrier 144. It should also be noted that if the input planetary gear set input member is input ring gear 136, then input ring gear 136 is not grounded to actuator housing 116, thereby allowing input ring gear 136 to rotate about planetary gear set axis 127.

As embodied herein, output sun gear 138 is coupled to valve spool 28 such that output sun gear 138 rotates together with valve spool 28 in a one-to-one relationship. Consequently, output sun gear 138 acts as an output planetary gear set output member. However, it should now be understood that the output planetary gear set output member could alternatively be output carrier 144 or output ring gear 146 where the output planetary gear set output member is the same type as the input planetary gear set input member. In other words, if the input planetary gear set input member is input carrier 134, then the output planetary gear set output member is output carrier 144 and if the input planetary gear set input member is input ring gear 136 then the output planetary gear set output member is output ring gear 146. It should be noted that if the output planetary gear set output member is output ring gear 146, then adjusting actuator 120 is not connected to output ring gear 146.

As embodied herein, input ring gear 136 is fixed to actuator housing 116, thereby grounding input ring gear 136 and preventing rotation of input ring gear 136 under all operating conditions. Consequently, input ring gear 136 acts as a rotational actuator grounded member. However, it should now be understood that the rotational actuator grounded member could alternatively be input sun gear 128, input carrier 134, output sun gear 138, output carrier 144, or output ring gear 146. It should be noted, however, that the rotational actuator grounded member is not the input planetary gear set input member and is also not the output planetary gear set output member.

As embodied herein, output ring gear 146 is connected to adjusting actuator 120 which allows output ring gear 146 to be rotationally positioned based on input from adjusting actuator 120. Consequently, output ring gear 146 acts as a rotational actuator adjusting member. However it should now be understood that the rotational actuator adjusting member could alternatively be input sun gear 128, input carrier 134, input ring gear 136, output sun gear 138, or output carrier 144 where the rotational actuator adjusting member is the same type as the rotational actuator grounded member. In other words, if the rotational actuator grounded member is output sun gear 138 then the rotational actuator adjusting member is input sun gear 128, if the rotational actuator grounded member is input carrier 134 then the rotational actuator adjusting member is output carrier 144, if the rotational actuator grounded member is output sun gear 138 then the rotational actuator adjusting member is input sun gear 128, if the rotational actuator grounded member is output carrier 144 then the rotation actuator adjusting member is input carrier 134 and if the rotational actuator grounded member is output ring gear 146 then the rotational actuator adjusting member is input ring gear 136.

As embodied herein, input carrier 134 and output carrier 144 are coupled together such that input carrier 134 and output carrier 144 rotate together in a one-to-one relationship. Consequently, input carrier 134 acts an input planetary gear set coupled member and output carrier 144 acts as an output planetary gear set coupled member. However, it should now be understood that the input planetary gear set coupled member could alternatively be input sun gear 128 or input ring gear 136 where the input planetary gear set coupled member is not the input planetary gear set input member, is not the rotational actuator grounded member, and is not the rotational actuator adjusting member. It should also now be understood that the output planetary gear set coupled member could alternatively be output sun gear 138 or output ring gear 146 where the output coupled member is not the output planetary gear set output member, is not the rotational actuator grounded member, and is not the rotational actuator adjusting member. It should be noted that if the input planetary gear set coupled member is input sun gear 128 then the output planetary gear set coupled member is output sun gear 138 where input sun gear 128 is coupled to output sun gear 138 to rotate together in a one-to-one relationship. It should also be noted that if the input planetary gear set coupled member is input ring gear 136 then the output planetary gear set coupled member is output ring gear 146 where input ring gear 136 is coupled to output ring gear 146 to rotate together in a one-to-one relationship.

As describe herein, adjusting actuator 120 has been embodied as adjusting gear 170 and an adjusting motor 172 where adjusting actuator gear 170 is a worm gear and where adjusting motor 172 is a DC electric motor. However, it should now be understood that adjusting actuator 120 could take any number of forms, by way of non-limiting example only, a linear actuator connected to the rotational actuator adjusting member, embodied herein as output ring gear 146, through linkage which translates the linear motion into rotational motion of the rotational actuator adjusting member. Similarly, adjusting actuator gear 170 may take any number of forms, by way of non-limiting example only, as a spur gear, bevel gear, or rack gear. Also similarly, adjusting motor 172 may take any number of forms, by way of non-limiting example, a hydraulic rotational actuator.

As described herein, actuator 100 has been embodied as being coupled to valve spool 28 where actuator 100 rotationally positions valve spool 28 relative to stator 18 such that valve spool 28 causes rotor 20 to rotate relative to stator 18. In this way, valve spool 28 can be described as an intermediate member that causes the camshaft phaser output member (rotor 20) to rotate relative to the camshaft phaser input member (stator 18). It should now be understood that actuator 100 is also useful in camshaft phasers of other designs which generally include a camshaft phaser input member connected to the crankshaft of the internal combustion engine for rotation therewith in a fixed ratio of rotation, a camshaft phaser output member connected to the camshaft of the internal combustion, and an intermediate member which is rotateable relative to the camshaft phaser input member such that rotation of the intermediate member causes the camshaft phaser output member to rotate relative to the camshaft phaser input member. One such alternative camshaft phaser example is shown in U.S. Pat. No. 8,516,983 to David et al., the disclosure of which is incorporated herein by reference in its entirety, which shows a camshaft phaser where rotation of a wave generator (the intermediate member) in a harmonic gear drive unit causes the camshaft phaser output member to rotate relative to the camshaft phaser input member.

It should now also be understood that rotational actuator 100 may alternatively be used to directly change the phase relationship between the crankshaft of internal combustion engine 10 and camshaft 14 by coupling the input planetary gear set input member to the crankshaft such that the input planetary gear set input member rotates with the crankshaft in a fixed ratio of rotation and also by coupling the output planetary gear set output member to the camshaft to rotate together with the camshaft in a one-to one relationship. Similarly, rotational actuator 100 may alternatively be used to directly change the phase relationship between two rotating members.

While clockwise rotation of rotor 20 relative to stator 18 has been described as advancing camshaft 14 and counterclockwise rotation of rotor 20 relative to stator 18 has been described as retarding camshaft 14, it should now be understood that this relationship may be reversed depending on whether camshaft phaser 12 is mounted to the front of internal combustion engine 10 (shown in the figures) or to the rear of internal combustion engine 10.

While camshaft phaser 12 has been described as using valve spool 28 to direct oil from oil source 61 to advance chambers 42 and retard chambers 44, it should now be understood that valve spool 28 may alternatively be used to direct oil from advance chambers 42 to retard chambers 44 and also to direct oil from retard chambers 44 to advance chambers 42, thereby taking advantage of torque reversals imparted on camshaft 14 to rotate rotor 20 relative to stator 18 as described in U.S. patent application Ser. No. 14/539,276 to Haltiner et al., the disclosure of which is incorporated herein by reference in its entirety.

While this invention has been described in terms of preferred embodiments thereof, it is not intended to be so limited, but rather only to the extent set forth in the claims that follow.

I claim:

1. A camshaft phaser for use with an internal combustion engine for controllably varying the phase relationship between a crankshaft and a camshaft in said internal combustion engine, said camshaft phaser comprising:
 a camshaft phaser input member connectable to said crankshaft of said internal combustion engine to provide a fixed ratio of rotation between said camshaft phaser input member and said crankshaft;
 a camshaft phaser output member connectable to said camshaft of said internal combustion engine;
 an intermediate member rotatable relative to said camshaft phaser input member such that rotation of said intermediate member relative to said camshaft phaser input member causes said camshaft phaser output member to rotate relative to said camshaft phaser input member; and a rotational actuator configured to selectively rotate said intermediate member relative to said camshaft phaser input member, said rotational actuator comprising:

a compound planetary gear set centered about a planetary gear set axis and having an input planetary gear set driven by said camshaft phaser input member and an output planetary gear set driven by said input planetary gear set;

and an adjusting actuator connected to said compound planetary gear set and being switchable between an idling state and an adjusting state, wherein said idling state causes said intermediate member to be rotated together with said camshaft phaser input member in a one-to-one relationship through said compound planetary gear set and wherein said adjusting state causes said intermediate member to rotate relative to said camshaft phaser input member through said compound planetary gear set.

2. A camshaft phaser as in claim 1 wherein:

said input planetary gear set has an input sun gear; a plurality of input planet gears radially surrounding and meshing with said input sun gear, said plurality of input planet gears being mounted on an input carrier that is rotatable relative to said input sun gear, and an input ring gear coaxial with said input sun gear and radially surrounding and meshing with said plurality of input planet gears;

said output planetary gear set has an output sun gear coaxial with said input sun gear; a plurality of output planet gears radially surrounding and meshing with said output sun gear, said plurality of output planet gears being mounted on an output carrier that is rotatable relative to said output sun gear; and an output ring gear coaxial with said output sun gear and radially surrounding and meshing with said plurality of output planet gears;

said input planetary gear set has an input planetary gear set input member selected from the group consisting of said input sun gear, said input carrier, and said input ring gear, said camshaft phaser input member being coupled to said input planetary gear set input member such that said camshaft phaser input member rotates together with said input planetary gear set input member in a one-to-one relationship;

said output planetary gear set has an output planetary gear set output member coupled to said intermediate member such that said intermediate member rotates together with said output planetary gear set output member in a one-to-one relationship, said output planetary gear set output member being said output sun gear if said input planetary gear set input member is said input sun gear, said output planetary gear set output member being said output carrier if said input planetary gear set input member is said input carrier, and said output planetary gear set output member being said output ring gear if said input planetary gear set input member is said input ring gear;

said rotational actuator has a rotational actuator grounded member selected from the group consisting of said input sun gear, said input carrier, said input ring gear, said output sun gear, said output carrier, and said output ring gear such that said rotational actuator grounded member is not said input planetary gear set input member and said rotational actuator grounded member is not said output planetary gear set output member, said rotational actuator grounded member being grounded, thereby preventing rotation of said rotational actuator grounded member;

said rotational actuator has a rotational actuator adjusting member selected from the group consisting of said input sun gear, said input carrier, said input ring gear, said output sun gear, and said output carrier, and said output ring gear, said rotational actuator adjusting member being said input sun gear if said rotational actuator grounded member is said output sun gear, said rotational actuator adjusting member being said input carrier if said rotational actuator grounded member is said output carrier, said rotational actuator adjusting member being said input ring gear if said rotational actuator grounded member is said output ring gear, said rotational actuator adjusting member being said output sun gear if said rotational actuator grounded member is said input sun gear, said rotational actuator adjusting member being said output carrier if said rotational actuator grounded member is said input carrier, and said rotational actuator adjusting member being said output ring gear if said rotational actuator grounded member is said input ring gear;

said input planetary gear set has an input planetary gear set coupled member selected from the group consisting of said input sun gear, said input carrier, and said input ring gear such that said input planetary gear set coupled member is not said input planetary gear set input member, said input planetary gear set coupled member is not said rotational actuator grounded member, and said input planetary gear set coupled member is not said rotational actuator adjusting member;

said output planetary gear set has an output planetary gear set coupled member that is coupled to said input planetary gear set coupled member such that said output planetary gear set coupled member rotates together with said input planetary gear set coupled member in a one-to-one relationship, said output planetary gear set coupled member being selected from the group consisting of said output sun gear, said output carrier, and said output ring gear such that said output planetary gear set coupled member is not said output planetary gear set output member, said output planetary gear set coupled member is not said rotational actuator grounded member, and said output planetary gear set coupled member is not said rotational actuator adjusting member; and said adjusting actuator is connected to said rotational actuator adjusting member and is configured to selectively rotate said rotational actuator adjusting member relative to said camshaft phaser input member, thereby rotating said intermediate member relative to said camshaft phaser input member through said input planetary gear set and said output planetary gear set.

3. A camshaft phaser as in claim 2 wherein the gear ratio of said input planetary gear set is equal to the gear ratio of said output planetary gear set.

4. A camshaft phaser as in claim 2 wherein said input carrier is coupled to said output carrier such that said input carrier rotates together with said output carrier in a one-to-one relationship.

5. A camshaft phaser as in claim 2 wherein said rotational actuator further comprises an actuator housing grounded to said internal combustion engine and defining a gear compartment wherein said compound planetary gear set is located within said gear compartment.

6. A camshaft phaser as in claim 5 wherein said rotational actuator grounded member is grounded to said actuator housing.

7. A camshaft phaser as in claim 6 wherein said rotational actuator grounded member is said input ring gear.

8. A camshaft phaser as in claim 7 wherein said rotational actuator adjusting member is said output ring gear.

9. A camshaft phaser as in claim 2 wherein said adjusting actuator comprises a worm gear which meshes with said rotational actuator adjusting member.

10. A camshaft phaser as in claim 9 wherein said rotational actuator adjusting member is said output ring gear and wherein said worm gear meshes with outward extending gear teeth of said output ring gear.

11. A camshaft phaser as in claim 9 wherein said adjusting actuator further comprises an electric motor which selectively rotates said worm gear.

12. A camshaft phaser as in claim 2 wherein said input carrier and said output carrier share a common carrier body, thereby causing said output carrier to rotate together with said input carrier in a one-to-one relationship.

13. A camshaft phaser as in claim 12 wherein said carrier body is annular in shape such that said carrier body extends radially outward from a carrier body inner surface to a carrier body outer surface and such that said carrier body extends axially from a carrier body first end to a carrier body second end.

14. A camshaft phaser as in claim 13 wherein said carrier body comprises:
a plurality of carrier body input planet gear recesses which extend axially into said carrier body from said carrier body first end such that each of said plurality of input planet gears is located within a respective one of said plurality of carrier body input planet gear recesses; and
a plurality of carrier body output planet gear recesses which extend axially into said carrier body from said carrier body second end such that each of said plurality of output planet gears is located within a respective one of said plurality of carrier body output planet gear recesses.

15. A camshaft phaser as in claim 14 wherein:
an input planet gear retainer is fixed to said carrier body first end such that each of said plurality of input planet gears is captured axially between said input planet gear retainer and a respective one of said plurality of carrier body input planet gear recesses; and
an output planet gear retainer is fixed to said carrier body first end such that each of said plurality of output planet gears is captured axially between said output planet gear retainer and a respective one of said plurality of carrier body output planet gear recesses.

16. A camshaft phaser as in claim 15 wherein:
each of said plurality of input planet gears includes an input planet gear axle extending therethrough such that each of said plurality of input planet gears rotate about said input planet gear axle and such that said input planet gear axle is supported at one end thereof by said carrier body and is supported at the other end thereof by said input planet gear retainer; and
each of said plurality of output planet gears includes an output planet gear axle extending therethrough such that each of said plurality of output planet gears rotate about said output planet gear axle and such that said output planet gear axle is supported at one end thereof by said carrier body and is supported at the other end thereof by said output planet gear retainer.

17. A camshaft phaser as in claim 15 wherein:
said input planetary gear set input member has an input planetary gear set input shaft fixed thereto such that said input planetary gear set input shaft couples said input planetary gear set to said camshaft phaser input member; and
said input planet gear retainer is annular in shape such that said input planetary gear set input shaft extends through said input planet gear retainer.

18. A camshaft phaser as in claim 14 wherein each of said plurality of carrier body input planet gear recesses are not axially aligned with said plurality of carrier body output planet gear recesses.

19. A camshaft phaser as in claim 2 wherein:
an advance chamber and a retard chamber are defined between said camshaft phaser input member and said camshaft phaser output member; and
said intermediate member is a valve spool which 1) selectively directs oil to said advance chamber and from said retard chamber, thereby retarding the phase relationship between said camshaft and said crankshaft and 2) selectively directs oil to said retard chamber and from said advance chamber, thereby advancing the phase relationship between said camshaft and said crankshaft.

20. A camshaft phaser as in claim 19 wherein:
said camshaft phaser input member is a stator having a plurality of lobes;
said camshaft phaser output member is a rotor coaxially disposed within said stator, said rotor having a plurality of vanes interspersed with said lobes;
said advance chamber is one of a plurality of advance chambers defined by said plurality of vanes and said plurality of lobes; and
said retard chamber is one of a plurality of retard chambers defined by said plurality of vanes and said plurality of lobes.

21. A camshaft phaser as in claim 20 wherein said valve spool is coaxially disposed within said rotor such that said valve spool is rotatable relative to said rotor and said stator, said valve spool defining a plurality of supply chambers and a plurality of vent chambers with said rotor such that said valve spool 1) selectively directs oil from said plurality of supply chambers to said plurality of advance chambers and directs oil from said plurality of retard chambers to said plurality of vent chambers, thereby retarding the phase relationship between said camshaft and said crankshaft and 2) selectively directs oil from said plurality of supply chambers to said plurality of retard chambers and directs oil from said plurality of advance chambers to said plurality of vent chambers, thereby advancing the phase relationship between said camshaft and said crankshaft.

22. A camshaft phaser for use with an internal combustion engine for controllably varying the phase relationship between a crankshaft and a camshaft in said internal combustion engine, said camshaft phaser comprising:
a camshaft phaser input member connectable to said crankshaft of said internal combustion engine to provide a fixed ratio of rotation between said camshaft phaser input member and said crankshaft;
a camshaft phaser output member connectable to said camshaft of said internal combustion engine;
an intermediate member rotatable relative to said camshaft phaser input member such that rotation of said intermediate member relative to said camshaft phaser input member causes said camshaft phaser output member to rotate relative to said camshaft phaser input member; and a rotational actuator configured to selectively rotate said intermediate member relative to said camshaft phaser input member; said rotational actuator comprising:

an input planetary gear set having an input sun gear; a plurality of input planet gears radially surrounding and meshing with said input sun gear, said plurality of input planet gears being mounted on an input carrier that is rotatable relative to said input sun gear, and an input ring gear coaxial with said input sun gear and radially surrounding and meshing with said plurality of input planet gears;

an output planetary gear set having an output sun gear coaxial with said input sun gear; a plurality of output planet gears radially surrounding and meshing with said output sun gear, said plurality of output planet gears being mounted on an output carrier that is rotatable relative to said output sun gear; and an output ring gear coaxial with said output sun gear and radially surrounding and meshing with said plurality of output planet gears;

and an adjusting actuator;

wherein said input planetary gear set has an input planetary gear set input member selected from the group consisting of said input sun gear, said input carrier, and said input ring gear, said camshaft phaser input member being coupled to said input planetary gear set input member such that said camshaft phaser input member rotates together with said input planetary gear set input member in a one-to-one relationship;

wherein said output planetary gear set has an output planetary gear set output member coupled to said intermediate member such that said intermediate member rotates together with said output planetary gear set output member in a one-to-one relationship, said output planetary gear set output member being said output sun gear if said input planetary gear set input member is said input sun gear, said output planetary gear set output member being said output carrier if said input planetary gear set input member is said input carrier, and said output planetary gear set output member being said output ring gear if said input planetary gear set input member is said input ring gear;

wherein said rotational actuator has a rotational actuator grounded member selected from the group consisting of said input sun gear, said input carrier, said input ring gear, said output sun gear, said output carrier, and said output ring gear such that said rotational actuator grounded member is not said input planetary gear set input member and said rotational actuator grounded member is not said output planetary gear set output member, said rotational actuator grounded member being grounded, thereby preventing rotation of said rotational actuator grounded member;

wherein said rotational actuator has a rotational actuator adjusting member selected from the group consisting of said input sun gear, said input carrier, said input ring gear, said output sun gear, and said output carrier, and said output ring gear, said rotational actuator adjusting member being said input sun gear if said rotational actuator grounded member is said output sun gear, said rotational actuator adjusting member being said input carrier if said rotational actuator grounded member is said output carrier, said rotational actuator adjusting member being said input ring gear if said rotational actuator grounded member is said output ring gear, said rotational actuator adjusting member being said output sun gear if said rotational actuator grounded member is said input sun gear, said rotational actuator adjusting member being said output carrier if said rotational actuator grounded member is said input carrier, and said rotational actuator adjusting member being said output ring gear if said rotational actuator grounded member is said input ring gear;

wherein said input planetary gear set has an input planetary gear set coupled member selected from the group consisting of said input sun gear, said input carrier, and said input ring gear such that said input planetary gear set coupled member is not said input planetary gear set input member, said input planetary gear set coupled member is not said rotational actuator grounded member, and said input planetary gear set coupled member is not said rotational actuator adjusting member;

wherein said output planetary gear set has an output planetary gear set coupled member that is coupled to said input planetary gear set coupled member such that said output planetary gear set coupled member rotates together with said input planetary gear set coupled member in a one-to-one relationship, said output planetary gear set coupled member being selected from the group consisting of said output sun gear, said output carrier, and said output ring gear such that said output planetary gear set coupled member is not said output planetary gear set output member, said output planetary gear set coupled member is not said rotational actuator grounded member, and said output planetary gear set coupled member is not said rotational actuator adjusting member; and wherein said adjusting actuator is connected to said rotational actuator adjusting member and is configured to selectively rotate said rotational actuator adjusting member relative to said camshaft phaser input member, thereby rotating said intermediate member relative to said camshaft phaser input member through said input planetary gear set and said output planetary gear set.

23. A rotational actuator for controllably varying the phase relationship between a first rotating member of a device and a second rotating member of said device, said rotational actuator comprising:

a compound planetary gear set centered about a planetary gear set axis and having an input planetary gear set driven by said first rotating member and an output planetary gear set driven by said input planetary gear set; and an adjusting actuator connected to said compound planetary gear set and being switchable between an idling state and an adjusting state, wherein said idling state causes said second rotating member to be rotated together with said first rotating member in a one-to-one relationship through said compound planetary gear set and wherein said adjusting state causes said second rotating member to rotate relative to said first rotating member through said compound planetary gear set;

wherein:

said input planetary gear set has an input sun gear; a plurality of input planet gears radially surrounding and meshing with said input sun gear, said plurality of input planet gears being mounted on an input carrier that is rotatable relative to said input sun gear, and an input ring gear coaxial with said input sun gear and radially surrounding and meshing with said plurality of input planet gears;

said output planetary gear set has an output sun gear coaxial with said input sun gear; a plurality of output planet gears radially surrounding and meshing with said output sun gear, said plurality of output planet gears being mounted on an output carrier that is rotatable relative to said output sun gear; and an output ring gear coaxial with said output sun gear and radially surrounding and meshing with said plurality of output planet gears;

said input planetary gear set has an input planetary gear set input member selected from the group consisting of said input sun gear, said input carrier, and said input ring gear, said first rotating member being coupled to said input planetary gear set input member such that said first rotating member rotates together with said input planetary gear set input member in a one-to-one relationship;

said output planetary gear set has an output planetary gear set output member coupled to said second rotating member such that said second rotating member rotates together with said output planetary gear set output member in a one-to-one relationship, said output planetary gear set output member being said output sun gear if said input planetary gear set input member is said input sun gear, said output planetary gear set output member being said output carrier if said input planetary gear set input member is said input carrier, and said output planetary gear set output member being said output ring gear if said input planetary gear set input member is said input ring gear;

said rotational actuator has a rotational actuator grounded member selected from the group consisting of said input sun gear, said input carrier, said input ring gear, said output sun gear, said output carrier, and said output ring gear such that said rotational actuator grounded member is not said input planetary gear set input member and said rotational actuator grounded member is not said output planetary gear set output member, said rotational actuator grounded member being grounded, thereby preventing rotation of said rotational actuator grounded member;

said rotational actuator has a rotational actuator adjusting member selected from the group consisting of said input sun gear, said input carrier, said input ring gear, said output sun gear, and said output carrier, and said output ring gear, said rotational actuator adjusting member being said input sun gear if said rotational actuator grounded member is said output sun gear, said rotational actuator adjusting member being said input carrier if said rotational actuator grounded member is said output carrier, said rotational actuator adjusting member being said input ring gear if said rotational actuator grounded member is said output ring gear, said rotational actuator adjusting member being said output sun gear if said rotational actuator grounded member is said input sun gear, said rotational actuator adjusting member being said output carrier if said rotational actuator grounded member is said input carrier, and said rotational actuator adjusting member being said output ring gear if said rotational actuator grounded member is said input ring gear;

said input planetary gear set has an input planetary gear set coupled member selected from the group consisting of said input sun gear, said input carrier, and said input ring gear such that said input planetary gear set coupled member is not said input planetary gear set input member, said input planetary gear set coupled member is not said rotational actuator grounded member, and said input planetary gear set coupled member is not said rotational actuator adjusting member;

said output planetary gear set has an output planetary gear set coupled member that is coupled to said input planetary gear set coupled member such that said output planetary gear set coupled member rotates together with said input planetary gear set coupled member in a one-to-one relationship, said output planetary gear set coupled member being selected from the group consisting of said output sun gear, said output carrier, and said output ring gear such that said output planetary gear set coupled member is not said output planetary gear set output member, said output planetary gear set coupled member is not said rotational actuator grounded member, and said output planetary gear set coupled member is not said rotational actuator adjusting member; and said adjusting actuator is connected to said rotational actuator adjusting member and is configured to selectively rotate said rotational actuator adjusting member relative to said first rotating member, thereby rotating said second rotating member relative to said first rotating member through said input planetary gear set and said output planetary gear set.

24. A rotational actuator as in claim 23 wherein the gear ratio of said input planetary gear set is equal to the gear ratio of said output planetary gear set.

25. A rotational actuator as in claim 23 wherein said input carrier is coupled to said output carrier such that said input carrier rotates together with said output carrier in a one-to-one relationship.

26. A rotational actuator as in claim 23 wherein said rotational actuator further comprises an actuator housing grounded to said device and defining a gear compartment wherein said compound planetary gear set is located within said gear compartment.

27. A rotational actuator as in claim 26 wherein said rotational actuator grounded member is grounded to said actuator housing.

28. A rotational actuator as in claim 27 wherein said rotational actuator grounded member is said input ring gear.

29. A rotational actuator as in claim 28 wherein said rotational actuator adjusting member is said output ring gear.

30. A rotational actuator as in claim 23 wherein said adjusting actuator comprises a worm gear which meshes with said rotational actuator adjusting member.

31. A rotational actuator as in claim 30 wherein said rotational actuator adjusting member is said output ring gear and wherein said worm gear meshes with outward extending gear teeth of said output ring gear.

32. A rotational actuator as in claim 30 wherein said adjusting actuator further comprises an electric motor which selectively rotates said worm gear.

33. A rotational actuator as in claim 23 wherein said input carrier and said output carrier share a common carrier body, thereby causing said output carrier to rotate together with said input carrier in a one-to-one relationship.

34. A rotational actuator as in claim 33 wherein said carrier body is annular in shape such that said carrier body extends radially outward from a carrier body inner surface to a carrier body outer surface and such that said carrier body extends axially from a carrier body first end to a carrier body second end.

35. A rotational actuator as in claim 34 wherein said carrier body comprises:

a plurality of carrier body input planet gear recesses which extend axially into said carrier body from said carrier body first end such that each of said plurality of input planet gears is located within a respective one of said plurality of carrier body input planet gear recesses; and a plurality of carrier body output planet gear recesses which extend axially into said carrier body from said carrier body second end such that each of said plurality of output planet gears is located within a respective one of said plurality of carrier body output planet gear recesses.

36. A rotational actuator as in claim 35 wherein:

an input planet gear retainer is fixed to said carrier body first end such that each of said plurality of input planet gears is captured axially between said input planet gear retainer and a respective one of said plurality of carrier body input planet gear recesses; and an output planet gear retainer is fixed to said carrier body first end such that each of said plurality of output planet gears is captured axially between said output planet gear retainer and a respective one of said plurality of carrier body output planet gear recesses.

37. A rotational actuator as in claim 36 wherein:

each of said plurality of input planet gears includes an input planet gear axle extending therethrough such that each of said plurality of input planet gears rotate about said input planet gear axle and such that said input planet gear axle is supported at one end thereof by said carrier body and is supported at the other end thereof by said input planet gear retainer; and each of said plurality of output planet gears includes an output planet gear axle extending therethrough such that each of said plurality of output planet gears rotate about said output planet gear axle and such that said output planet gear axle is supported at one end thereof by said carrier body and is supported at the other end thereof by said output planet gear retainer.

38. A rotational actuator as in claim 35 wherein each of said plurality of carrier body input planet gear recesses are not axially aligned with said plurality of carrier body output planet gear recesses.

* * * * *